(12) United States Patent
Tsai et al.

(10) Patent No.: US 10,602,549 B2
(45) Date of Patent: Mar. 24, 2020

(54) METHOD AND APPARATUS OF HANDLING BEAM FAILURE RECOVERY IN A WIRELESS COMMUNICATION SYSTEM

(71) Applicant: ASUSTek Computer Inc., Taipei (TW)

(72) Inventors: Hsin-Hsi Tsai, Taipei (TW); Yu-Hsuan Guo, Taipei (TW); Yi-Hsuan Kung, Taipei (TW); Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/280,497

(22) Filed: Feb. 20, 2019

(65) Prior Publication Data
US 2019/0274169 A1  Sep. 5, 2019

Related U.S. Application Data

(60) Provisional application No. 62/638,525, filed on Mar. 5, 2018.

(51) Int. Cl.
*H04W 74/08* (2009.01)
*H04W 76/34* (2018.01)
(Continued)

(52) U.S. Cl.
CPC ...... *H04W 74/0833* (2013.01); *H04B 7/0626* (2013.01); *H04B 7/088* (2013.01); *H04W 56/003* (2013.01); *H04W 56/0005* (2013.01); *H04W 56/0045* (2013.01); *H04W 74/006* (2013.01); *H04W 76/34* (2018.02)

(58) Field of Classification Search
CPC ........... H04W 74/0833; H04W 56/003; H04W 76/34; H04B 7/088; H04B 7/0626
See application file for complete search history.

(56) References Cited

U.S. PATENT DOCUMENTS

2012/0250662 A1  10/2012  Kuo
2017/0171825 A1  6/2017  Takeda et al.
(Continued)

FOREIGN PATENT DOCUMENTS

WO  2011085200  7/2011

OTHER PUBLICATIONS

3GPP TSG-RAN WG1 Meeting RAN1 #90bis, R1-1718542, Prague, Czech Republic, Oct. 9-13, 2017.
(Continued)

*Primary Examiner* — Kabir A Timory
(74) *Attorney, Agent, or Firm* — Blue Capital Law Firm, P.C.

(57) ABSTRACT

A method and apparatus are disclosed from the perspective of a User Equipment (UE). In one embodiment, the method includes receiving a Random Access Channel (RACH) configuration from a network node, wherein the RACH configuration indicates at least one Physical Random Access Channel (PRACH) resource for beam failure recovery. The method further includes receiving a timing advance command from the network node, and starting or restarting a time alignment timer when receiving the timing advance command. The method also includes releasing the at least one PRACH resource for the beam failure recovery indicated by the RACH configuration when the timing alignment timer expires.

18 Claims, 13 Drawing Sheets

(51) Int. Cl.
    *H04B 7/06*         (2006.01)
    *H04B 7/08*         (2006.01)
    *H04W 56/00*      (2009.01)
    *H04W 74/00*      (2009.01)

(56) References Cited

U.S. PATENT DOCUMENTS

| | | |
|---|---|---|
| 2018/0176959 A1 | 6/2018 | Dinan |
| 2018/0192388 A1 | 7/2018 | Langereis |
| 2018/0227980 A1 | 8/2018 | Uchino et al. |
| 2019/0215048 A1* | 7/2019 | Cirik .................... H04B 7/0408 |

OTHER PUBLICATIONS

3GPP TSG-RAN WG2 NR Ad hoc 0118, R2-1800560, Vancouver, Canada, Jan. 22-26, 2018.
3GPP TSG-RAN WG1 Meeting #92, R1-1802824, Athens, Greece, Feb. 26-Mar. 2, 2018.
3GPP TSG-RAN WG2 Meeting #101, R2-1803230, Athens, Greece, Feb. 26-Mar. 2, 2018.
European Search Report from corresponding EP application No. 19158222.0 dated Jun. 17, 2019.

* cited by examiner

METHOD AND APPARATUS OF HANDLING BEAM FAILURE RECOVERY IN A WIRELESS COMMUNICATION SYSTEM

CROSS-REFERENCE TO RELATED APPLICATIONS

The present application claims the benefit of U.S. Provisional Patent Application Ser. No. 62/638,525 filed on Mar. 5, 2018, the entire disclosure of which is incorporated herein in its entirety by reference.

FIELD

This disclosure generally relates to wireless communication networks, and more particularly, to a method and apparatus of handling beam failure recovery in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes receiving a Random Access Channel (RACH) configuration from a network node, wherein the RACH configuration indicates at least one Physical Random Access Channel (PRACH) resource for beam failure recovery. The method further includes receiving a timing advance command from the network node starting or restarting a time alignment timer when receiving the timing advance command. The method also includes releasing the at least one PRACH resource for the beam failure recovery indicated by the RACH configuration when the timing alignment timer expires.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 v 15.0.0, "NR; NR and NG-RAN Overall Description; Stage 2 (Release 15)"; TS 38.321 v 15.0.0, "NR; Medium Access Control (MAC) protocol specification (Release 15)"; TS 38.331 v 15.0.0; "NR; Radio Resource Control (RRC) Protocol specification (Release 15)"; TS 38.213 v 15.0.0; "NR; Physical layer procedures for control (Release 15)"; Final Report of 3GPP TSG RAN WG1 #89 v 1.0.0 (Hangzhou, China, 15-19 May 2017); Final Report of 3GPP TSG RAN WG1 #AH_NR2 v 1.0.0 (Qingdao, China, 27-30 Jun. 2017); Final Report of 3GPP TSG RAN WG1 #90 v 1.0.0 (Prague, Czech Rep, 21-25 Aug. 2017); Final Report of 3GPP TSG RAN WG1 #AH_NR3 v 1.0.0 (Nagoya, Japan, 18-21 Sep. 2017); Final Report of 3GPP TSG RAN WG1 #90bis v 1.0.0 (Prague, Czech Rep, 9-13 Oct. 2017); Final Chairman's Note of 3GPP TSG RAN WG1 Meeting #91 (Reno, USA, 27 Nov.-1 Dec. 2017) (updated with email approvals); and Draft Report of 3GPP TSG RAN WG1 #AH_1801 v 0.1.0 (Vancouver, Canada, 22-26 Jan. 2018). The standards and documents listed above are hereby expressly incorporated by reference in their entirety.

Figure 1:
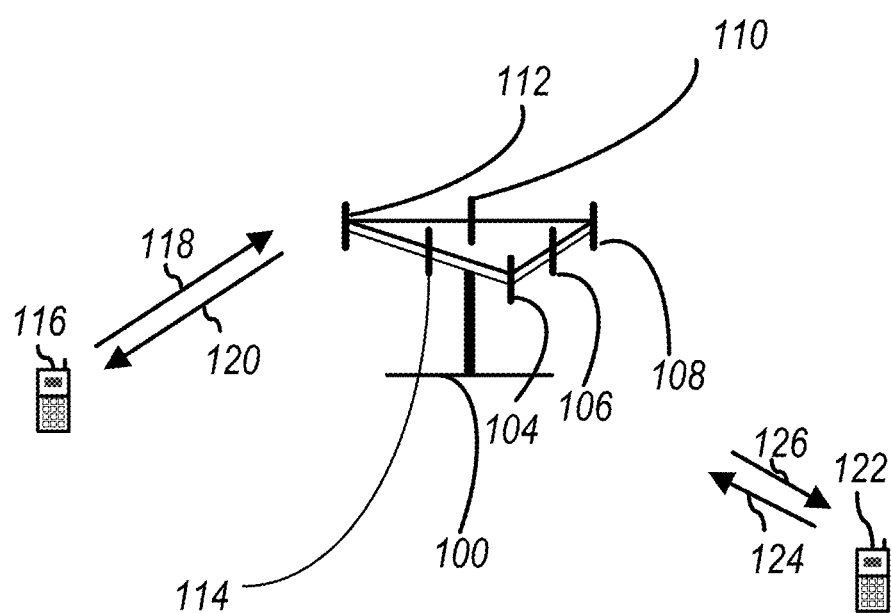
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
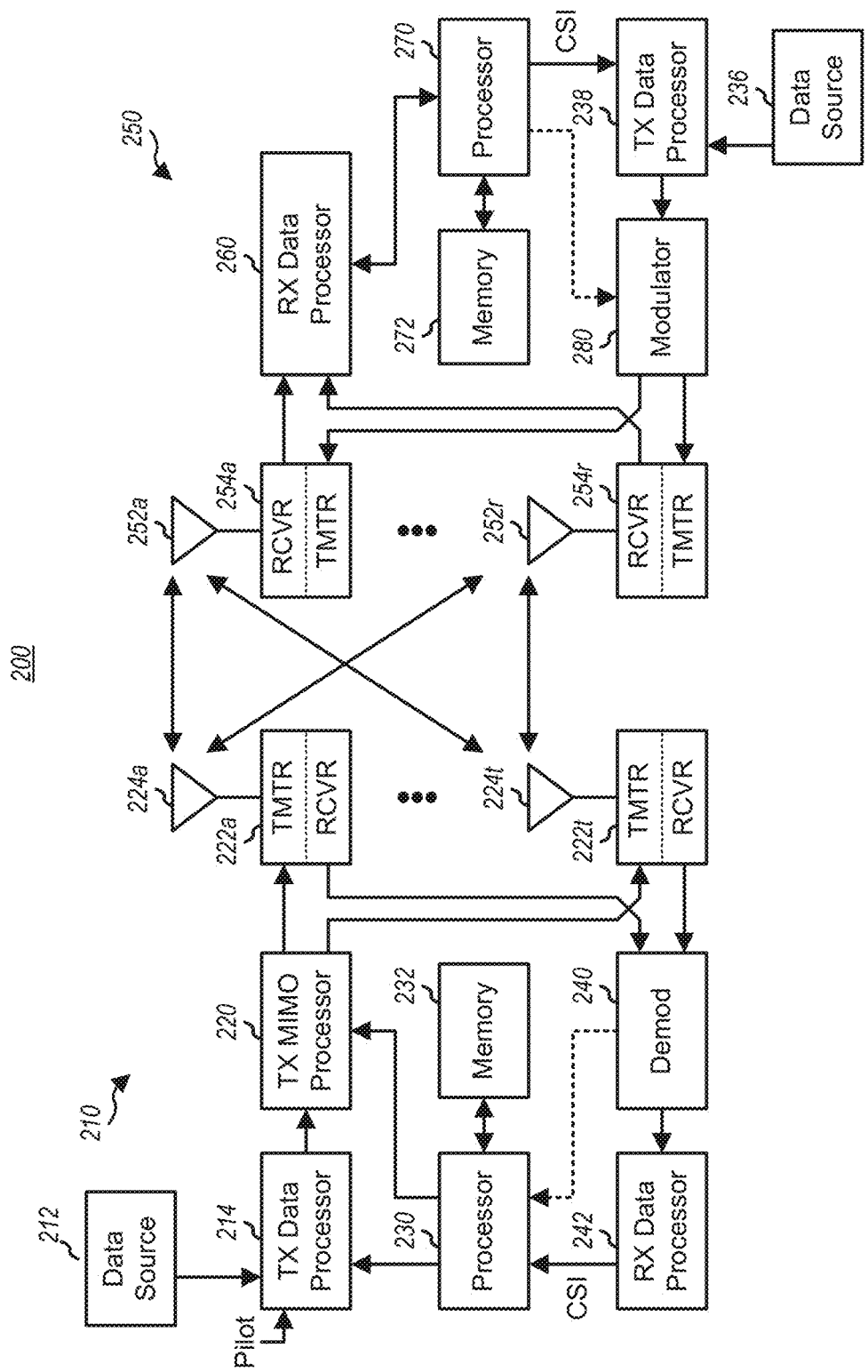
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
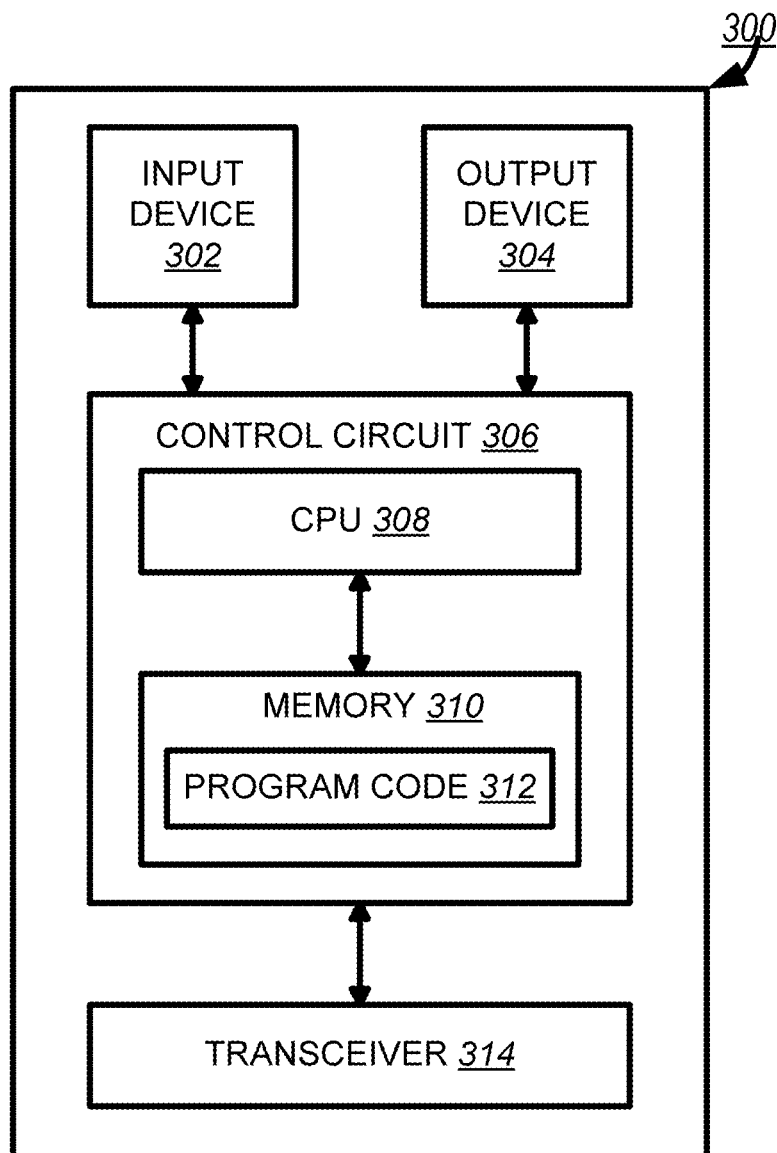
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
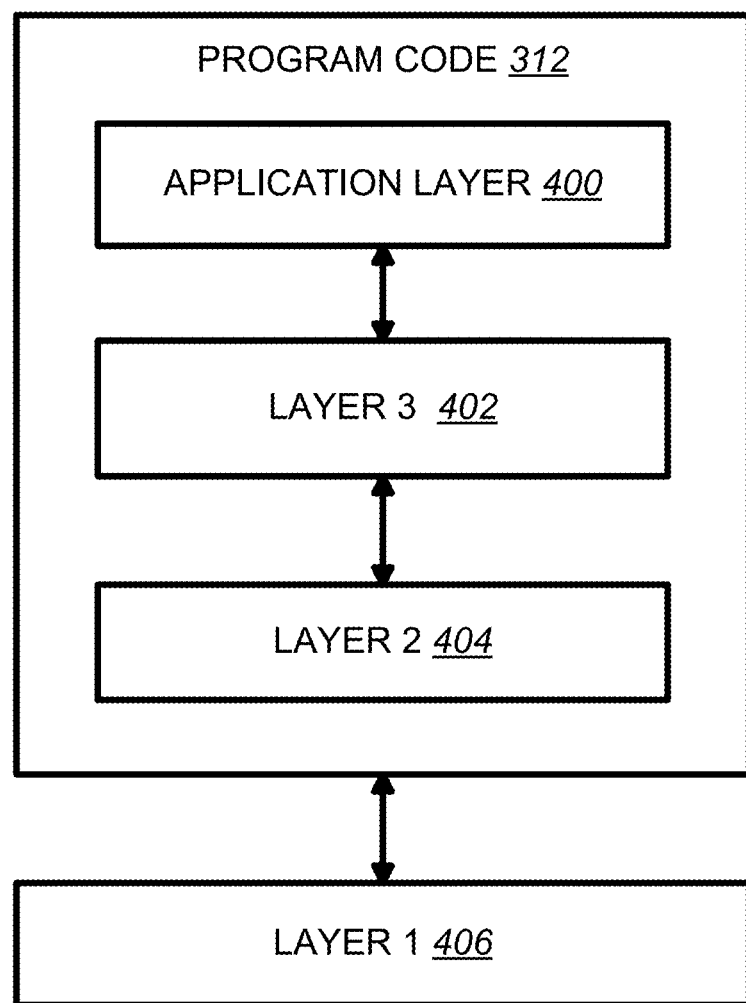
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.300 v 15.0.0 introduces random access procedure as follows:

5.3.4 Random Access

Random access preamble sequences, of two different lengths are supported. Long sequence length 839 is applied with subcarrier spacings of 1.25 and 5 kHz and short sequence length 139 is applied with sub-carrier spacings 15, 30, 60 and 120 kHz. Long sequences support unrestricted sets and restricted sets of Type A and Type B, while short sequences support unrestricted sets only.

Multiple RACH preamble formats are defined with one or more RACH OFDM symbols, and different cyclic prefix and guard time. The PRACH preamble configuration to use is provided to the UE in the system information.

The UE calculates the PRACH transmit power for the retransmission of the preamble based on the most recent estimate pathloss and power ramping counter. If the UE conducts beam switching, the counter of power ramping remains unchanged.

The system information informs the UE of the association between the SS blocks and the RACH resources. The threshold of the SS block for RACH resource association is based on the RSRP and network configurable.

[ . . . ]

9.2.6 Random Access Procedure

The random access procedure is triggered by a number of events, for instance:

Initial access from RRC_IDLE;
    RRC Connection Re-establishment procedure;
    Handover;
    DL or UL data arrival during RRC_CONNECTED when UL synchronisation status is "non-synchronised";
    Transition from RRC_INACTIVE;
    Request for Other SI (see subclause 7.3).

Furthermore, the random access procedure takes two distinct forms: contention based and non-contention based as shown on FIG. 9.2.6-1 below. Normal DL/UL transmission can take place after the random access procedure.

For initial access in a cell configured with SUL, the UE selects the SUL carrier if and only if the measured quality of the DL is lower than a broadcast threshold. Once started, all uplink transmissions of the random access procedure remain on the selected carrier.

Figure 5:
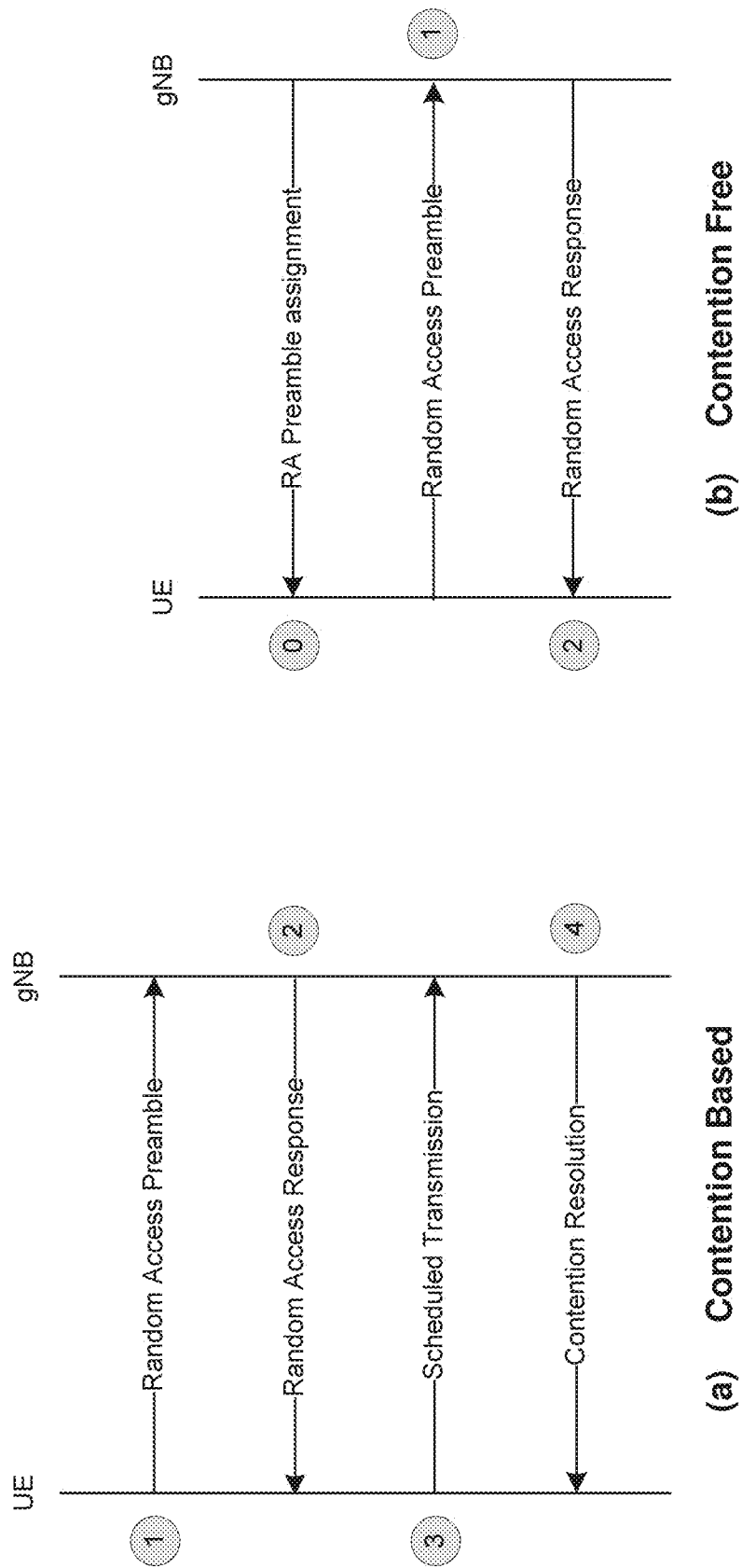
FIG. 5 is a reproduction of FIG. 9.2.6-1 of 3GPP TS 38.300 V15.0.0.
Figure 9:
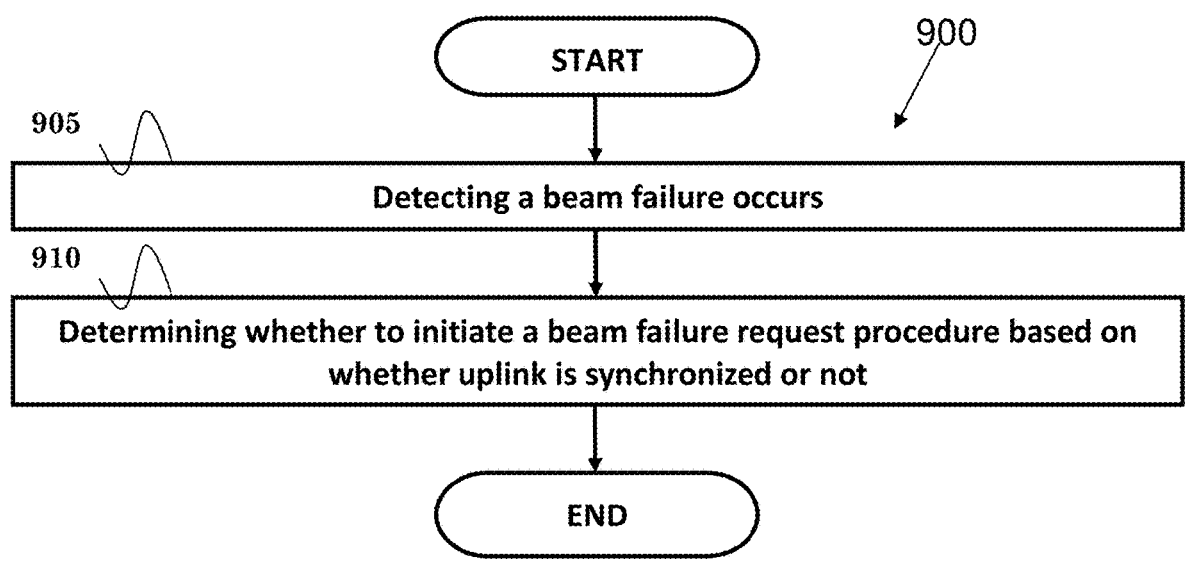
FIG. 9 is a flow chart according to one exemplary embodiment.

[FIG. 9.2.6-1 of 3GPP TS 38.300 v 15.0.0, entitled "Random Access Procedures", is reproduced as FIG. 5 of the present application]

3GPP TS 38.321 v 15.0.0 introduces random access procedure as follows:

5.1 Random Access Procedure 5.1.1 Random Access Procedure Initialization

The Random Access procedure described in this subclause is initiated by a PDCCH order, by the MAC entity itself, by beam failure indication from lower layer, or by RRC for the events in accordance with TS 38.300 [2]. There is only one Random Access procedure ongoing at any point in time in a MAC entity. The Random Access procedure on an SCell other than PSCell shall only be initiated by a PDCCH order with ra-PreambleIndex different from 0b000000.

NOTE 1: If the MAC entity receives a request for a new Random Access procedure while another is already ongoing in the MAC entity, it is up to UE implementation whether to continue with the ongoing procedure or start with the new procedure (e.g. for SI request).

RRC configures the following parameters for the Random Access procedure:

prach-ConfigIndex: the available set of PRACH resources for the transmission of the Random Access Preamble;
    ra-PreambleInitialReceivedTargetPower: initial preamble power;
    rsrp-ThresholdSSB, csirs-dedicatedRACH-Threshold, and sul-RSRP-Threshold: an RSRP threshold for the selection of the SS block and corresponding PRACH resource;
    ra-PreamblePowerRampingStep: the power-ramping factor;
    ra-PreambleIndex: Random Access Preamble;
    ra-PreambleTx-Max: the maximum number of preamble transmission;
    if SSBs are mapped to preambles:
        startIndexRA-PreambleGroupA, numberOfRA-Preambles, and numberOfRA-PreamblesGroupA for each SSB in each group (SpCell only).
    else:
        startIndexRA-PreambleGroupA, numberOfRA-Preambles, and numberOfRA-PreamblesGroupA in each group (SpCell only).
    If numberOfRA-PreamblesGroupA is equal to numberOfRA-Preambles, there is no Random Access Preambles group B.
    The preambles in Random Access Preamble group A are the preambles startIndexRA-PreambleGroupA to startIndexRA-PreambleGroupA+numberOfRA-PreamblesGroupA-1;
    The preambles in Random Access Preamble group B, if exists, are the preambles startIndexRA-PreambleGroupA+numberOfRA-PreamblesGroupA to startIndexRA-PreambleGroupA+numberOfRA-Preambles-1.

NOTE 2: if random Access Preambles group B is supported by the cell and SSBs are mapped to preambles, random access preambles group B is included in each SSB.

if Random Access Preambles group B exists:
        ra-Msg3SizeGroupA (per cell): the threshold to determine the groups of Random Access Preambles.
    the set of Random Access Preambles for SI request and corresponding PRACH resource(s), if any;
    the set of Random Access Preambles for beam failure recovery request and corresponding PRACH resource(s), if any;
    ra-ResponseWindow: the time window to monitor RA response(s);
    bfr-ResponseWindow: the time window to monitor response(s) on beam failure recovery request;
    ra-ContentionResolutionTimer: the Contention Resolution Timer (SpCell only).

In addition, the following information for related Serving Cell is assumed to be available for UEs:

if Random Access Preambles group B exists:
        if the MAC Entity is configured with supplementaryUplink, and SUL carrier is selected for performing Random Access Procedure:
            $P_{CMAX,c\text{-}SUL}$: the configured UE transmitted power of the SUL carrier.

else:

$P_{C_{MAX,c}}$: the configured UE transmitted power of the Serving Cell performing the Random Access Procedure.

[ . . . ]

When the Random Access procedure is initiated, the MAC entity shall:

1> flush the Msg3 buffer;
1> set the PREAMBLE_TRANSMISSION_COUNTER to 1;
1> set the PREAMBLE_POWER_RAMPING_COUNTER to 1;
1> set the PREAMBLE_BACKOFF to 0 ms;
1> if the carrier to use for the Random Access procedure is explicitly signalled:
   2> select the signalled carrier for performing Random Access procedure.
1> else if the carrier to use for the Random Access procedure is not explicitly signalled; and
1> if the cell for the Random Access procedure is configured with supplementaryUplink; and
1> if the RSRP of the downlink pathloss reference is less than sul-RSRP-Threshold:
   2> select the SUL carrier for performing Random Access procedure;
   2> set the PCMAX to $P_{C_{MAX,c\text{-}SUL}}$.
1> else:
   2> select the normal carrier for performing Random Access procedure;
   2> set the PCMAX to $P_{C_{MAX,c}}$.
1> perform the Random Access Resource selection procedure (see subclause 5.1.2).

5.1.2 Random Access Resource Selection

The MAC entity shall:

1> if the Random Access procedure was initiated by a beam failure indication from lower layer; and
1> if the contention free PRACH resources for beam failure recovery request associated with any of the SS blocks and/or CSI-RSs have been explicitly provided by RRC; and
1> if at least one of the SS blocks with SS-RSRP above rsrp-ThresholdSSB amongst the associated SS blocks or the CSI-RSs with CSI-RSRP above csirs-dedicatedRACH-Threshold amongst the associated CSI-RSs is available:
   2> select an SS block with SS-RSRP above rsrp-ThresholdSSB amongst the associated SS blocks or a CSI-RS with CSI-RSRP above csirs-dedicatedRACH-Threshold amongst the associated CSI-RSs;
   2> set the PREAMBLE_INDEX to a ra-PreambleIndex corresponding to the selected SS block or CSI-RS from the set of Random Access Preambles for beam failure recovery request.
1> else if the ra-PreambleIndex has been explicitly provided by either PDCCH or RRC; and
1> if the ra-PreambleIndex is not 0b000000; and
1> if contention free PRACH resource associated with SS blocks or CSI-RS have not been explicitly provided by RRC:
   2> set the PREAMBLE_INDEX to the signalled ra-PreambleIndex.
1> else if the contention free PRACH resources associated with SS blocks have been explicitly provided by RRC and at least one SS block with SS-RSRP above rsrp-ThresholdSSB amongst the associated SS blocks is available:
   2> select an SS block with SS-RSRP above rsrp-ThresholdSSB amongst the associated SS blocks;
   2> set the PREAMBLE_INDEX to a ra-PreambleIndex corresponding to the selected SS block.
1> else if the contention free PRACH resources associated with CSI-RSs have been explicitly provided by RRC and at least one CSI-RS with CSI-RSRP above csirs-dedicatedRACH-Threshold amongst the associated CSI-RSs is available:
   2> select a CSI-RS with CSI-RSRP above csirs-dedicatedRACH-Threshold amongst the associated CSI-RSs;
   2> set the PREAMBLE_INDEX to a ra-PreambleIndex corresponding to the selected CSI-RS.
1> else:
   2> select a SS block with SS-RSRP above rsrp-ThresholdSSB;
   2> if Msg3 has not yet been transmitted:
     3> if Random Access Preambles group B exists; and
     3> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)-ra-PreambleInitialReceivedTargetPower:
       4> select the Random Access Preambles group B.
     3> else:
       4> select the Random Access Preambles group A.
   2> else (i.e. Msg3 is being retransmitted):
     3> select the same group of Random Access Preambles as was used for the preamble transmission attempt corresponding to the first transmission of Msg3.
   2> if the association between Random Access Preambles and SS blocks is configured:
     3> select a ra-PreambleIndex randomly with equal probability from the random access preambles associated with the selected SS block and the selected group.
   2> else:
     3> select a ra-PreambleIndex randomly with equal probability from the random access preambles within the selected group.
   2> set the PREAMBLE_INDEX to the selected ra-PreambleIndex.
1> if an SS block is selected above and an association between PRACH occasions and SS blocks is configured:
   2> determine the next available PRACH occasion from the PRACH occasions corresponding to the selected SS block.
1> else if a CSI-RS is selected above and an association between PRACH occasions and CSI-RSs is configured:
   2> determine the next available PRACH occasion from the PRACH occasions corresponding to the selected CSI-RS.
1> else:
   2> determine the next available PRACH occasion.
1> perform the Random Access Preamble transmission procedure (see subclause 5.1.3).

5.1.3 Random Access Preamble transmission

The MAC entity shall, for each preamble:

1> if PREAMBLE_TRANSMISSION_COUNTER is greater than one; and
1> if the notification of suspending power ramping counter has not been received from lower layers; and 1> if SS block selected is not changed (i.e. same as the previous random access preamble transmission):
2> increment PREAMBLE_POWER_RAMPING_COUNTER by 1.
1> set PREAMBLE_RECEIVED_TARGET_POWER to ra-PreambleInitialReceivedTargetPower+DELTA_PREAMBLE+(PREAMBLE_POWER_RAMPING_COUNTER-1)*powerRampingStep;
1> except for contention free preamble for beam failure recovery request, compute the RA-RNTI associated with the PRACH in which the Random Access Preamble is transmitted;
1> instruct the physical layer to transmit the preamble using the selected PRACH, corresponding RA-RNTI (if available), PREAMBLE_INDEX and PREAMBLE_RECEIVED_TARGET_POWER.

The RA-RNTI associated with the PRACH in which the Random Access Preamble is transmitted, is computed as:

$$RA\text{-}RNTI=1+s\_id+14*t\_id+14*X*f\_id+14*X*Y*ul\_carrier\_id$$

where s_id is the index of the first OFDM symbol of the specified PRACH ($0 \leq s\_id < 14$), t_id is the index of the first slot of the specified PRACH in a system frame ($0 \leq t\_id < X$), f_id is the index of the specified PRACH in the frequency domain ($0 \leq f\_id < Y$), and ul_carrier_id is the UL carrier used for Msg1 transmission (0 for normal carrier, and 1 for SUL carrier). The values X and Y are specified in TS 38.213 [6].

5.1.4 Random Access Response Reception

Once the Random Access Preamble is transmitted and regardless of the possible occurrence of a measurement gap, the MAC entity shall:

1> if 'multiple preamble transmission' has been signalled:
2> start the ra-ResponseWindow at the start of the first PDCCH occasion after a fixed duration of X symbols (specified in TS 38.213 [6]) from the end of the first preamble transmission;
2> monitor the PDCCH of the SpCell for Random Access Response(s) identified by the RA-RNTI(s) while ra-ResponseWindow is running.
1> else if the contention free Random Access Preamble for beam failure recovery request was transmitted by the MAC entity:
2> start the bfr-ResponseWindow at the start of the first PDCCH occasion after a fixed duration of X symbols (specified in TS 38.213 [6]) from the end of the preamble transmission;
2> monitor the PDCCH of the SpCell for response to beam failure recovery request identified by the C-RNTI while bfr-ResponseWindow is running.
1> else:
2> start the ra-ResponseWindow at the start of the first PDCCH occasion after a fixed duration of X symbols (specified in TS 38.213 [6]) from the end of the preamble transmission;
2> monitor the PDCCH of the SpCell for Random Access Response(s) identified by the RA-RNTI while the ra-ResponseWindow is running.
1> if PDCCH transmission is addressed to the C-RNTI; and
1> if the contention free Random Access Preamble for beam failure recovery request was transmitted by the MAC entity:
2> consider the Random Access procedure successfully completed.
1> else if a downlink assignment has been received on the PDCCH for the RA-RNTI and the received TB is successfully decoded:
2> if the Random Access Response contains a Backoff Indicator subheader:
3> set the PREAMBLE_BACKOFF to value of the BI field of the Backoff Indicator subheader using Table 7.2-1.
2> else:
3> set the PREAMBLE_BACKOFF to 0 ms.
2> if the Random Access Response contains a Random Access Preamble identifier corresponding to the transmitted PREAMBLE_INDEX (see subclause 5.1.3):
3> consider this Random Access Response reception successful.
2> if the Random Access Response reception is considered successful:
3> if the Random Access Response includes RAPID only:
4> consider this Random Access procedure successfully completed;
4> indicate the reception of an acknowledgement for the SI request to upper layers.
3> else:
4> if 'multiple preamble transmission' has been signalled:
5> stop transmitting remaining preambles, if any.
4> apply the following actions for the Serving Cell where the Random Access Preamble was transmitted:
5> process the received Timing Advance Command (see subclause 5.2);
5> indicate the ra-PreambleInitialReceivedTargetPower and the amount of power ramping applied to the latest preamble transmission to lower layers (i.e. (PREAMBLE_POWER_RAMPING_COUNTER-1)*powerRampingStep);
5> process the received UL grant value and indicate it to the lower layers.
4> if the Random Access Preamble was not selected by the MAC entity among the common PRACH preambles:
5> consider the Random Access procedure successfully completed.
4> else:
5> set the TEMPORARY_C-RNTI to the value received in the Random Access Response;
5> if this is the first successfully received Random Access Response within this Random Access procedure:
6> if the transmission is not being made for the CCCH logical channel:
7> indicate to the Multiplexing and assembly entity to include a C-RNTI MAC CE in the subsequent uplink transmission.
6> obtain the MAC PDU to transmit from the Multiplexing and assembly entity and store it in the Msg3 buffer.
1> if ra-ResponseWindow expires, and if the Random Access Response containing Random Access Preamble identifiers that matches the transmitted PREAMBLE_INDEX has not been received; or
1> if bfr-ResponseWindow expires and if the PDCCH addressed to the C-RNTI has not been received:

2> consider the Random Access Response reception not successful;
2> increment PREAMBLE_TRANSMISSION_COUNTER by 1;
2> if PREAMBLE_TRANSMISSION_COUNTER=ra-PreambleTx-Max+1:
  3> if the Random Access Preamble is transmitted on the SpCell:
    4> indicate a Random Access problem to upper layers.
  3> else if the Random Access Preamble is transmitted on a SCell:
    4> consider the Random Access procedure unsuccessfully completed.
2> if in this Random Access procedure, the Random Access Preamble was selected by MAC among the common PRACH preambles:
  3> select a random backoff time according to a uniform distribution between 0 and the PREAMBLE_BACKOFF;
  3> delay the subsequent Random Access Preamble transmission by the backoff time.
2> perform the Random Access Resource selection procedure (see subclause 5.1.2).

The MAC entity may stop ra-ResponseWindow (and hence monitoring for Random Access Response(s)) after successful reception of a Random Access Response containing Random Access Preamble identifiers that matches the transmitted PREAMBLE_INDEX.

HARQ operation is not applicable to the Random Access Response transmission.

5.1.5 Contention Resolution

Contention Resolution is based on either C-RNTI on PDCCH of the SpCell or UE Contention Resolution Identity on DL-SCH.

Once Msg3 is transmitted, the MAC entity shall:
  1> start the ra-ContentionResolutionTimer and restart the ra-ContentionResolutionTimer at each HARQ retransmission;
  1> monitor the PDCCH while the ra-ContentionResolutionTimer is running regardless of the possible occurrence of a measurement gap;
  1> if notification of a reception of a PDCCH transmission is received from lower layers:
    2> if the C-RNTI MAC CE was included in Msg3:
      3> if the Random Access procedure was initiated by the MAC sublayer itself or by the RRC sublayer and the PDCCH transmission is addressed to the C-RNTI and contains an UL grant for a new transmission; or
      3> if the Random Access procedure was initiated by a PDCCH order and the PDCCH transmission is addressed to the C-RNTI:
        4> consider this Contention Resolution successful;
        4> stop ra-ContentionResolutionTimer;
        4> discard the TEMPORARY_C-RNTI;
        4> consider this Random Access procedure successfully completed.
    2> else if the CCCH SDU was included in Msg3 and the PDCCH transmission is addressed to its TEMPORARY_C-RNTI:
      3> if the MAC PDU is successfully decoded:
        4> stop ra-ContentionResolutionTimer;
        4> if the MAC PDU contains a UE Contention Resolution Identity MAC CE; and
        4> if the UE Contention Resolution Identity in the MAC CE matches the CCCH SDU transmitted in Msg3:
          5> consider this Contention Resolution successful and finish the disassembly and demultiplexing of the MAC PDU;
          5> set the C-RNTI to the value of the TEMPORARY_C-RNTI;
          5> discard the TEMPORARY_C-RNTI;
          5> consider this Random Access procedure successfully completed.
        4> else
          5> discard the TEMPORARY_C-RNTI;
          5> consider this Contention Resolution not successful and discard the successfully decoded MAC PDU.
  1> if ra-ContentionResolutionTimer expires:
    2> discard the TEMPORARY_C-RNTI;
    2> consider the Contention Resolution not successful.
  1> if the Contention Resolution is considered not successful:
    2> flush the HARQ buffer used for transmission of the MAC PDU in the Msg3 buffer;
    2> increment PREAMBLE_TRANSMISSION_COUNTER by 1;
    2> if PREAMBLE_TRANSMISSION_COUNTER=preambleTransMax+1:
      3> indicate a Random Access problem to upper layers.
    2> select a random backoff time according to a uniform distribution between 0 and the PREAMBLE_BACKOFF;
    2> delay the subsequent Random Access Preamble transmission by the backoff time;
    2> perform the Random Access Resource selection procedure (see subclause 5.1.2).

5.1.6 Completion of the Random Access Procedure

Upon completion of the Random Access procedure, the MAC entity shall:
  1> discard explicitly signalled ra-PreambleIndex, if any;
  1> flush the HARQ buffer used for transmission of the MAC PDU in the Msg3 buffer.

3GPP TS 38.321 v 15.0.0 introduces the maintenance of UL time alignment as follows:

5.2 Maintenance of Uplink Time Alignment

RRC configures the following parameters for the maintenance of UL time alignment:
  timeAlignmentTimer (per TAG) which controls how long the MAC entity considers the Serving Cells belonging to the associated TAG to be uplink time aligned.

The MAC entity shall:
  1> when a Timing Advance Command MAC CE is received, and if a $N_{TA}$ (as defined in TS 38.211 [8]) has been maintained with the indicated TAG:
    2> apply the Timing Advance Command for the indicated TAG;
    2> start or restart the timeAlignmentTimer associated with the indicated TAG.
  1> when a Timing Advance Command is received in a Random Access Response message for a serving cell belonging to a TAG:
    2> if the Random Access Preamble was not selected by the MAC entity:
      3> apply the Timing Advance Command for this TAG;
      3> start or restart the timeAlignmentTimer associated with this TAG.

2> else if the timeAlignmentTimer associated with this TAG is not running:
  3> apply the Timing Advance Command for this TAG;
  3> start the timeAlignmentTimer associated with this TAG;
  3> when the contention resolution is considered not successful as described in subclause 5.1.5, stop timeAlignmentTimer associated with this TAG.
2> else:
  3> ignore the received Timing Advance Command.
1> when a timeAlignmentTimer expires:
  2> if the timeAlignmentTimer is associated with the PTAG:
    3> flush all HARQ buffers for all serving cells;
    3> notify RRC to release PUCCH for all serving cells, if configured;
    3> notify RRC to release SRS for all serving cells, if configured;
    3> clear any configured downlink assignments and configured uplink grants;
    3> consider all running timeAlignmentTimers as expired;
    3> maintain $N_{TA}$ (defined in TS 38.211 [8]) of all TAGs.
  2> else if the timeAlignmentTimer is associated with an STAG, then for all Serving Cells belonging to this TAG:
    3> flush all HARQ buffers;
    3> notify RRC to release PUCCH, if configured;
    3> notify RRC to release SRS, if configured;
    3> clear any configured downlink assignments and configured uplink grants;
    3> maintain $N_{TA}$ (defined in TS 38.211 [8]) of this TAG.

When the MAC entity stops uplink transmissions for an SCell due to the fact that the maximum uplink transmission timing difference or the maximum uplink transmission timing difference the UE can handle between TAGs of any MAC entity of the UE is exceeded, the MAC entity considers the timeAlignmentTimer associated with the SCell as expired.

The MAC entity shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the MAC entity shall not perform any uplink transmission on any Serving Cell except the Random Access Preamble transmission on the SpCell.

3GPP TS 38.321 v 15.0.0 introduces Beam Failure Recovery Request procedure as follows:

5.17 Beam Failure Recovery Request Procedure

The beam failure recovery request procedure is used for indicating to the serving gNB of a new SSB or CSI-RS when beam failure is detected on the serving SSB(s)/CSI-RS(s). Beam failure is detected by the lower layers and indicated to the MAC entity.

The MAC entity shall:
1> if beam failure indication has been received from lower layers:
  2> start beamFailureRecoveryTimer;
  2> initiate a Random Access procedure (see subclause 5.1) on the SpCell.
1> if the beamFailureRecoveryTimer expires:
  2> indicate beam failure recovery request failure to upper layers.
1> if downlink assignment or uplink grant on the PDCCH addressed for the C-RNTI has been received:
  2> stop and reset beamFailureRecoveryTimer;
  2> consider the Beam Failure Recovery Request procedure successfully completed.

3GPP TS 38.331 v 15.0.0 introduces RACH corresponding configuration as follows:

RACH-ConfigCommon

The RACH-ConfigCommon IE is used to specify the cell specific random-access parameters.

| RACH-ConfigCommon information element |
| --- |
| ```
-- ASN1START
-- TAG-RACH-CONFIG-COMMON-START
RACH-ConfigCommon ::=          SEQUENCE {
[...]
    cbra-SSB-ResourceList          CBRA-SSB-ResourceList,
    ra-ContentionResolutionTimer   ENUMERATED { sf8, sf16, sf24, sf32, sf40, sf48, sf56, sf64},
        -- Msg1 (RA preamble): -- UE may select the SS block and corresponding PRACH resource for
path-loss estimation and (re)transmission
        -- based on SS blocks that satisfy the threshold (see 38.213, section REF)
    ssb-Threshold                  TYPE_FFS!
                    OPTIONAL,
[...]
    -- PRACH configuration index. Corresponds to L1 parameter 'PRACHConfigurationIndex' (see
38.211, section 6.3.3.2)
    prach-ConfigurationIndex       INTEGER (0..255)
                    OPTIONAL,
[...]
    -- CORESET configured for random access. When the field is absent the UE uses the CORESET
according to pdcchConfigSIB1
    -- Corresponds to L1 parameter 'rach-coreset-configuration' (see 38.211?, section
FFS_Section)
    rach-ControlResourceSet                  FFS_Value    OPTIONAL,
[...]
}
CBRA-SSB-ResourceList ::=       SEQUENCE (SIZE(1..maxRAssbResources)OF CBRA-SSB-Resource
CBRA-SSB-Resource ::=           SEQUENCE {
    ssb                             SSB-ID,
    startIndexRA-PreambleGroupA     PreambleStartIndex,
    numberofRA-PreamblesGroupA      NumberOfRA-Preambles,
``` |

| RACH-ConfigCommon information element |
| --- |
| numberOfRA-Preambles              NumberOfRA-Preambles,<br>-- PRACH configuration for SSB configuration (i.e. time and frequency location)<br>-- FFS / TODO: Type Definition for RA-Resources.<br>    ra-Resources                  RA-Resources<br>}<br>PreambleStartIndex       ::= INTEGER (0..maxRA-PreambleIndex)<br>NumberofRA-Preambles   ::= INTEGER (1.. maxNrOfRA-PreamblesPerSSB)<br>-- TAG-RACH-CONFIG-COMMON-STOP<br>-- ASN1STOP |

RACH-ConfigDedicated

The IE RACH-ConfigDedicated is used to specify the dedicated random access parameters.

| RACH-ConfigDedicated information element |
| --- |
| -- ASN1START<br>-- TAG-RACH-CONFIG-DEDICATED-START<br>-- FFS: resources for msg1-based on-demand SI request<br>-- FFS: resources for beam failure recovery request<br>RACH-ConfigDedicated ::= SEQUENCE {<br>    -- Resources for handover to the cell<br>    cfra-Resources           CFRA-Resources,<br>    -- Subcarrier spacing for msg2 for contention-free RA procedure for handover<br>    rar-SubcarrierSpacing    SubcarrierSpacing<br>}<br>-- FFS_CHECK: Isn't it sufficient to have just one list and the CHOICE inside the list element (around the ssb/csirs)?<br>CFRA-Resources ::=       CHOICE {<br>    cfra-ssb-ResourceList    SEQUENCE (SIZE(1..maxRAssbResources) OF CFRA-SSB-Resource,<br>    cfra-csirs-ResourceList  SEQUENCE (SIZE(1..maxRAcsirsResources)OF CFRA-CSIRS-Resource<br>}<br>CFRA-SSB-Resource ::=  SEQUENCE {<br>    ssb                     SSB-ID,<br>    ra-PreambleIndex       INTEGER (0..FFS_XX),<br>    -- PRACH configuration for SSB configuration (i.e. time and frequency location)<br>    ra-Resources            RA-Resources -- Definition FFS<br>}<br>CFRA-CSIRS-Resource ::= SEQUENCE {<br>    csirs                 CSIRS-ID, -- FFS where the CSI-RS are defined (e.g. MO)<br>    ra-PreambleIndex       INTEGER (0..FFS_XX),<br>    -- PRACH configuration for CSIRS configuration (i.e. time and frequency location)<br>    ra-Resources            RA-Resources -- Definition FFS<br>}<br>-- TAG-RACH-CONFIG-DEDICATED-STOP<br>-- ASN1STOP |

3GPP TS 38.213 v 15.0.0 introduces beam failure corresponding behaviors as follows:

6 Link Reconfiguration Procedures

A UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If the UE is not provided with higher layer parameter Beam-Failure-Detection-RS-ResourceConfig, the UE determines $\bar{q}_0$ to include SS/PBCH blocks and periodic CSI-RS configurations with same values for higher layer parameter TCI-StatesPDCCH as for control resource sets that the UE is configured for monitoring PDCCH as described in Subclause 10.1. The physical layer in the UE shall assess the radio link quality according to the set $\bar{q}_0$ of resource configurations against the threshold $Q_{out,LR}$ [10, TS 38.133]. The threshold $Q_{out,LR}$ corresponds to the default value of higher layer parameter RLM-IS-OOS-thresholdConfig and Beam-failure-candidate-beam-threshold, respectively. For the set $\bar{q}_0$, the UE shall assess the radio link quality only according to periodic CSI-RS resource configurations or SS/PBCH blocks that are quasi co-located, as described in [6, TS 38.214], with the DM-RS of PDCCH receptions DM-RS monitored by the UE. The UE applies the configured $Q_{in,LR}$ threshold for the periodic CSI-RS resource configurations. The UE applies the $Q_{out,LR}$ threshold for SS/PBCH blocks after scaling a SS/PBCH block transmission power with a value provided by higher layer parameter Pc_SS.

The physical layer in the UE shall, in slots where the radio link quality according to the set $\bar{q}_0$ is assessed, provide an indication to higher layers when the radio link quality for all corresponding resource configurations in the set $\bar{q}_0$ that the UE uses to assess the radio link quality is worse than the threshold $Q_{out,LR}$.

The UE shall provide to higher layers information identifying a periodic CSI-RS configuration index or SS/PBCH block index $q_{new}$ from the set $\bar{q}_1$.

A UE is configured with one control resource set by higher layer parameter Beam-failure-Recovery-Response-CORESET. The UE may receive from higher layers, by parameter Beam-failure-recovery-request-RACH-Resource, a configuration for a PRACH transmission as described in Subclause 8.1. After 4 slots from the slot of the PRACH transmission, the UE monitors PDCCH for a DCI format with CRC scrambled by C-RNTI, within a window configured by higher layer parameter Beam-failure-recovery-request-window, and receives PDSCH according to an antenna port quasi co-location associated with periodic CSI-RS configuration or SS/PBCH block with index $q_{new}$ in set $\bar{q}_1$, in the control resource set configured by higher layer parameter Beam-failure-Recovery-Response-CORESET.

There are some agreements on beam management and beam failure recovery in the RAN1 #89 meeting, as stated in the Final Report of 3GPP TSG RAN WG1 #89 v 1.0.0 (Hangzhou, China, 15-19 May 2017) as follows:
  Support the following channel(s) for beam failure recovery request transmission:
    Non-contention based channel based on PRACH, which uses a resource orthogonal to resources of other PRACH transmissions, at least for the FDM case
    FFS Contention-based PRACH resources as supplement to contention-free beam failure recovery resources
      From traditional RACH resource pool
      4-step RACH procedure is used
      Note: contention-based PRACH resources is used e.g., if a new candidate beam does not have resources for contention-free PRACH-like transmission
  To receive gNB response for beam failure recovery request, a UE monitors NR PDCCH with the assumption that the corresponding PDCCH DM-RS is spatial QCL'ed with RS of the UE-identified candidate beam(s)

There are some agreements on beam management and beam failure recovery in the RAN1 #90 meeting, as stated in the Final Report of 3GPP TSG RAN WG1 #90 v 1.0.0 (Prague, Czech Rep, 21-25 Aug. 2017) as follows:
  Beam failure is declared only when all serving control channels fail.
  In addition to periodic CSI-RS, SS-block within the serving cell can be used for new candidate beam identification
    The following options can be configured for new candidate beam identification
      CSI-RS only
        Note: in this case, SSB will not be configured for new candidate beam identification
      SS block only
        Note: in this case, CSI-RS will not be configured for new candidate beam identification
      FFS: CSI-RS+SS block There are some agreements on beam management and beam failure recovery in the RAN1 #AH_NR3 meeting, as stated in the Final Report of 3GPP TSG RAN WG1 #AH_NR3 v 1.0.0 (Nagoya, Japan, 18-21 Sep. 2017) as follows:
A UE is RRC configured with a list of up to M candidate Transmission Configuration Indication (TCI) states at least for the purposes of QCL indication
  Whether M equal to or larger than $2^N$ is for further study, where N is the size of the DCI field for PDSCH
  FFS: Mapping between the candidate states to the states described by N bit DCI field for PDSCH
  Each TCI state can be configured with one RS Set
  Each ID (FFS: details of ID) of DL RS at least for the purpose of spatial QCL in an RS Set can refer to one of the following DL RS types:
    SSB
    Periodic CSI-RS
    Aperiodic CSI-RS
    Semi-persistent CSI-RS
  FFS: Other RS (e.g. TRS, PTRS) in an RS set depending on outcome of discussions in the QCL agenda item
  FFS: Mechanisms to initialize/update the ID of a DL RS(s) in the RS Set used at least for spatial QCL purposes
    At least the following two mechanisms are FFS: (1) explicit signalling to the UE of the DL RS(s) ID and corresponding TCI state (2) implicit association of the DL RS ID(s) to a TCI state based on measurements by the UE.
    The mechanisms used for different RS types are FFS
  FFS: Whether or not a TCI state includes other parameters(s), e.g., for PDSCH rate matching purposes
  FFS: Value of N, where N is at most [3] bits
Note: More details on specification of more than one DMRS port group and more than one RS Set per TCI state is to be completed after the December release.
[ . . . ]
The QCL configuration for PDCCH contains the information which provides a reference to a TCI state
  Alt 1: The QCL configuration/indication is on a per CORESET basis
    The UE applies the QCL assumption on the associated CORESET monitoring occasions. All search space(s) within the CORESET utilize the same QCL.
  Alt 2: The QCL configuration/indication is on a per search space basis
    The UE applies the QCL assumption on an associated search space. This could mean that in the case where there are multiple search spaces within a CORESET, the UE may be configured with different QCL assumptions for different search spaces.
  Note: The indication of QCL configuration is done by RRC or RRC+MAC CE (FFS: by DCI) Note: The above options are provided as input to the control channel agenda item discussion
[ . . . ]
  For new candidate beam identification purpose
    In CSI-RS only case, a direct association is configured between only CSI-RS resources and dedicated PRACH resources
    In SS block only case, a direct association is configured between only SS block resources and dedicated PRACH resources
    In CSI-RS+SS block case (if supported), an association is configured between resources of CSI-RS/SSB and dedicated PRACH resources
      CSI-RS and SSB can be associated with the same dedicated resource through QCL association There are some agreements on beam management and beam failure recovery in the RAN1 #90bis meeting, as stated in the Final Report of 3GPP TSG RAN WG1 #90bis v 1.0.0 (Prague, Czech Rep, 9-13 Oct. 2017) as follows:
  gNB response is transmitted via a PDCCH addressed to C-RNTI
    FFS: DCI format for gNB response
  Dedicated CORESET(s) is applied for monitoring gNB response for BFRQ. The CORESET is down-selected from the following two alternatives:
    Alt 1: the same CORESET (s) as before beam failure
    Alt 2: dedicatedly configured CORESET for beam failure recovery.

[ . . . ]
Specification supports the CSI-RS+SS block case for the purpose of new candidate beam identification
  The above case is configured by gNB
    Note: a dedicated PRACH resource is configured to either an SSB or a CSI-RS resource
  Following two scenarios are supported when a UE is configured with CSI-RS+SSB
    Scenario 1: PRACHs are associated to SSBs only
      In this scenario, CSI-RS resources for new beam identification can be found from the QCL association to SSB(s).
    Scenario 2: Each of the multiple PRACHs is associated to either an SSB or a CSI-RS resource
  FFS: multiple SSB can be associated with the same uplink resource.
[ . . . ]
Beam failure detection is determined based on the following quality measure:
  Hypothetical PDCCH BLER
    A beam recovery request can be transmitted if the number of consecutive detected beam failure instance exceeds a configured maximum number
      (Working assumption) If hypothetical PDCCH BLER is above a threshold, it is counted as beam failure instance
        Note: Beam failure is determined when all serving beams fail
      The candidate beam can be identified when metric X of candidate beam is higher than a threshold
        FFS: metric X
        1 or 2 threshold values are introduced
          If 2 thresholds are introduced, one is for SSB and the other is for CSI-RS
  One of the following alternatives will be down-selected in RAN1#91
    Alt-1: Fixed value
    Alt-2: Configurable value by RRC signaling
    RAN2 should specify the RRC signaling to configuration of the threshold
For gNB to uniquely identify UE identity from a beam failure recovery request transmission
  A PRACH sequence is configured to UE
At least the following parameters should be configured for dedicated PRACH resources for beam failure recovery
  Per UE parameters
    Preamble sequence related parameters
      E.g., root sequence, cyclic shift, and preamble index
    Maximum number of transmissions
    Maximum number of power rampings
    Target received power
    Retransmission Tx power ramping step size
    Beam failure recovery timer
  Per dedicated PRACH resource parameters
    Frequency location information
    Time location, if it is only a subset of all RACH symbols (e.g., PRACH mask)
    Associated SSB or CSI-RS information
  Note: as a starting point, use initial access preamble transmission mechanism and parameters. If any issue is identified, new mechanism can be introduced.
    No further RRC signalling for above UE parameters is required if reusing the same parameter as initial access There are some agreements on beam management and beam failure recovery in the RAN1 #91 meeting, as stated in the Final Report of 3GPP TSG RAN WG1 #91 (Reno, USA, 27 Nov.-1 Dec. 2017) as follows:

TABLE 1

Beam-failure-recovery-request-RACH-Resource configuration

| RRC parameter | Value range | Note/description |
| --- | --- | --- |
| RootSequenceIndex-BFR | {0, 1, . . ., 137} | Short sequence only |
| ZeroCorrelationZoneConfig-BFR | {0, 1, . . . , 15} | Determine cyclic shift. Value range same as IA session |
| PreambleInitialReceivedTargetPower-BFR | FFS | Value range same as IA session |
| ra-PreambleIndexConfig-BFR | FFS | Value range same as IA session |
| PreambleTransMax-BFR | FFS | Value range same as IA session |
| powerRampingStep-BFR | FFS | |
| CandidateBeamThreshold | | One threshold for CSIRS |
| Candidate-Beam-RS-List | | A list of RS indices. The entry of each list can be a SSB index or a CSI-RS resource index |
| PRACH-resource-dedicated-BFR | | The following fields are defined for each candidate beam RS |
| Candidate-Beam-RS | {SSB index or CSI-RS ID} | RS index that is associated with the following PRACH resource Note: if the candidate-beam-RS-List includes both CSIRS resource indexes and SSB indexes, AND only SSB indexes are associated with PRACH resources, NR standard should specify a rule that the UE should Monitor both CSI-RS and SSB for New Beam Identification. |
| ra-PreambleIndex-BFR | FFS | Preamble index used to select one from a sequence pool |
| prach-FreqOffset-BFR | FFS | FDM'ed to other PRACH resources. Value range same as IA session |
| masks for RACH resources and/or SSBs | FFS | Time domain mask. Value range same as IA session |

TABLE 2

Other RRC parameters related to beam failure recovery

| RRC parameter (UE-specific parameters) | Value range | Note/description |
|---|---|---|
| ResponseWindowSize-BFR | FFS | Time duration for monitoring gNB response in Beam-Failure-Recovery-Response-CORESET after BFRQ. Similar to ra-ResponseWindowSize |
| Beam-failure-recovery-Timer | FFS | Details on UE behaviour related to the timer is FFS |
| NrOfBeamFailureInstance | FFS | Consecutive number of beam failure instances for declaring beam failure |
| Beam-Failure-Recovery-Response-CORESET | FFS | |

The measurement metric for candidate beam selection is L1-RSRP
   An RRC parameter is introduced to configure the threshold value for L1-RSRP based on CSI-RS
      Another threshold can be implicitly derived for L1-RSRP based on SSB
The BLER used for beam failure recovery reuses RLM default BLER threshold for RLM out-of-sync declaration
If the Candidate-Beam-RS-List includes both CSI-RS resource indexes and SSB indexes, AND only SSB indexes are associated with PRACH resources,
   UE identifies PRACH resources for CSI-RS resource(s) in the Candidate-Beam-RS-List via spatial QCL indication between SSBs and CSI-RS resources, if UE-identified new beam(s) is associated with CSI-RS resource(s)
      UE sends BFRQ through a PRACH resource associated with the SSB, which is spatially QCLed with the CSI-RS resource.
   Note: in case the Candidate-Beam-RS-List includes both CSI-RS resource indexes and SSB indexes, AND only SSB indexes are associated with PRACH resources, a UE is not expected to be configured by Candidate-Beam-RS-List a CSI-RS resource which does not have a spatial QCL association with any of the SSB in the same Candidate-Beam-RS-List.
If there are multiple beams above the threshold for new beam identification, it is up to UE implementation to select a PRACH resource associated to the SSB/CSI-RS resource satisfying the threshold condition.
Upon receiving gNB response for beam failure recovery request transmission
   UE shall monitor CORESET-BFR for dedicated PDCCH reception until one of the following conditions is met:
      Reconfigured by gNB to another CORESET for receiving dedicated PDCCH and activated by MAC-CE a TCI state if the configured CORESET has K>1 configured TCI states
         FFS: if a default TCI state can be assumed for PDCCH after reconfiguration without MAC-CE activation
      Re-indicated by gNB to another TCI state(s) by MAC-CE of CORESET(s) before beam failure
   Until the reconfiguration/activation/re-indication of TCI state(s) for PDCCH, UE shall assume DMRS of PDSCH is spatial QCL'ed with DL RS of the UE-identified candidate beam in the beam failure recovery request
   After the reconfiguration/activation/re-indication of TCI state(s) for PDCCH, UE is not expected to receive a DCI in CORESET-BFR.
   Note: this applies to same carrier case.
There are some agreements on beam management and beam failure recovery in the RAN1 #AH_1801 meeting, as stated in the Draft Report of 3GPP TSG RAN WG1 #AH_1801 v 0.1.0 (Vancouver, Canada, 22-26 Jan. 2018) as follows:
For beam failure detection model, PHY performs detection of beam failure instances, and indicates a flag to higher layer if a beam failure instance is detected
Change candidate beam selection model to the following alternatives:
   PHY performs L1-RSRP evaluation of each candidate new beam, provides to higher layer the subset of {beam RS index, L1-RSRP measurements} that satisfies the L1-RSRP threshold
      RAN 1 expects higher layer to perform new candidate beam selection based on the subset of {beam RS index, RSRP measurements}
   Note: The mapping between beam RS index(es) to PRACH resource(s)/sequence(s) is done in MAC
   Indication of beam failure instance to higher layer is periodic and indication interval is determined by the shortest periodicity of BFD RS $\bar{q}_0$, which is also lower bounded by [10] ms.
      Note: if the evaluation is below beam failure instance BLER threshold, there is no indication to higher layer.
   PHY provides to higher layer one or more sets of {beam RS index, L1-RSRP measurement} that satisfies the L1-RSRP threshold upon higher layer request.
One or multiple of following terminologies may be used hereafter:
   BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
   TRP: A transmission and reception point provides network coverage and directly communicates with UEs. TRP could also be referred to as distributed unit (DU) or network node.
   Cell: A cell is composed of one or multiple associated TRPs, i.e. coverage of the cell is composed of coverage of all associated TRP(s). One cell is controlled by one BS. Cell could also be referred to as TRP group (TRPG).
   Serving beam: A serving beam for a UE is a beam generated by a network node, e.g. TRP, which is currently used to communicate with the UE, e.g. for transmission and/or reception.
   Candidate beam: A candidate beam for a UE is a candidate of a serving beam. Serving beam may or may not be candidate beam.
   NR-PDCCH: A channel carries downlink control signal which is used to control communication between a UE and a network side. A network transmits NR-PDCCH on configured control resource set (CORESET) to the UE.
It is generally assumed that PHY layer in the UE may assess the radio link quality according the set of serving beam(s) (e.g. SS block and/or CSI-RS) against a threshold. If the radio link quality is worse than the threshold, PHY layer may indicate a "beam failure instance" notification to higher layer (e.g. MAC layer). MAC layer may determine whether to initiate a beam failure recovery request procedure and/or a random access procedure based on the (consecutive) number of beam failure instance. For example, the MAC layer may maintain a BFR counter and a specific timer. The specific timer is for resetting the BFR counter, e.g. the specific timer is (re)started upon every new reception of "beam failure instance" from PHY layer, and/or the BFR counter is reset at the specific timer expiry. The BFR counter may be maintained and incremented at every "beam failure instance" indication. When the BFR counter reaches a maximum number, the UE (e.g. MAC layer) may trigger a beam failure recovery request procedure and/or a random access procedure for beam failure recovery request procedure. If the random access procedure is initiated, the UE may transmit a preamble on a PRACH resource (e.g. beam failure recovery request) to a network. Then the network may transmit a PDCCH to the UE for BFR. The PDCCH may be a response to the preamble on a PRACH resource. The PDCCH may be scrambled by C-RNTI. Throughout this invention, the BFR request procedure can be referred to a link reconfiguration procedure or a beam failure recovery request procedure.

However, in the case where the TA timer of the UE is expired (e.g. the UL is not synchronized), if the UE initiates a BFR request procedure and/or a corresponding RA procedure, the UE could not transmit a confirmation (e.g. ACK/NACK) to the network when the UE successfully receives the PDCCH. Thus, the network may not be aware of whether the UE successfully received the PDCCH or not. For example, the network may not know whether the BFR request procedure of the UE is successful or not. It may cause the misalignment for the result of BFR between the UE and the network. In addition, the UE may not utilize UL grant which may be indicated via the PDCCH. Alternatively, the UE may not transmit a confirmation (e.g. ACK/NACK) for a downlink transmission corresponding to a downlink assignment if the PDCCH indicates the downlink assignment to the UE.

In addition, if the UE detects beam failure when TA timer is not running, and then initiates a CF RA procedure (e.g. by using CF PRACH resource for BFR) for beam failure recovery, the UE could not enter in-sync state (TA is not aligned) after finishing the CF RA procedure for beam failure recovery. An illustration is shown in FIG. 6.

Figure 6:
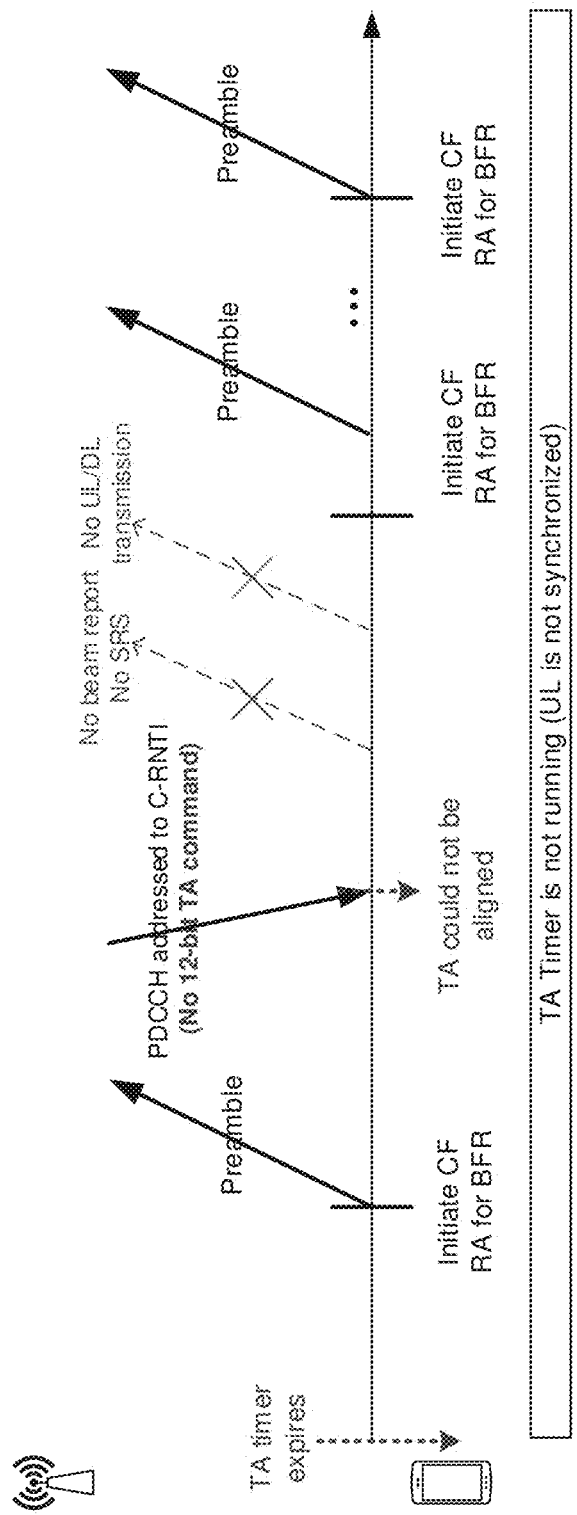
FIG. 6 a diagram according to one exemplary embodiment.
Figure 10:
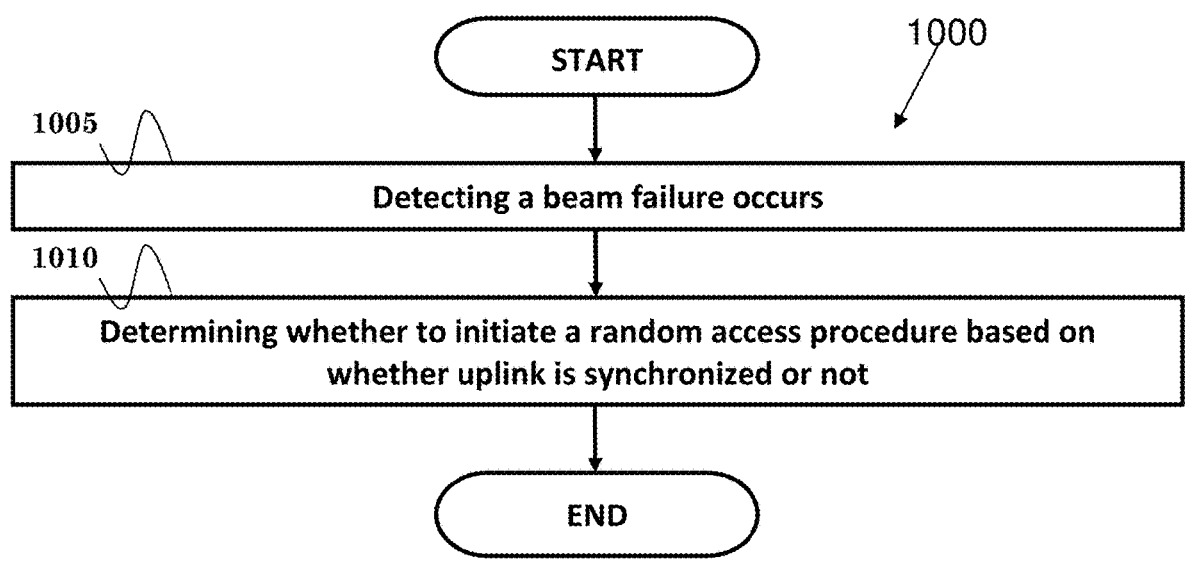
FIG. 10 is a flow chart according to one exemplary embodiment.

As shown in FIG. 6, the UE initiates a CF RA procedure for BFR, and transmits a BFR request (e.g. via a random access preamble) to the network. The network may transmit a response for BFR request, which is a PDCCH addressed to C-RNTI (e.g. DL assignment or UL grant), to the UE. However, the response for BFR request could not include an absolute TA command (e.g. 12-bit TA command) since the absolute TA command is only allowed to be included in random access response (RAR) as shown in FIG. 10 (which is a reproduction FIG. 6.2.3-1 of 3GPP 38.321 V15.0.0). Thus, even the beam failure is recovered, TA is still not aligned. If the network would like to recover the TA, the network may need to send a PDCCH order to trigger another RA procedure, or if the UE has UL data to transmit, the UE may need to trigger a CB RA procedure to acquire UL grant and an absolute TA value. Therefore, the UE may need to perform one CF RA for BFR to recover beam, and to perform another RA to recover TA. The impact may be delay and/or power consumption for unnecessary RA procedure. Furthermore, when UL is not synchronized, the UE could not transmit beam report (e.g. CSI report associated with L1-RSRP) and/or SRS, so it's hard for the network to maintain the serving beam, which may incur frequent beam failure (e.g. if UE is moving). Since CF RA for BFR is not able to recover TA, e.g. UL/DL transmission is still not available even performing CFRA for BFR, CF PRACH resources for BFR may be not necessary when TA timer expires.

In order to avoid the misalignment for BFR between the UE and the network, avoid the UE performing useless CF RA procedure for BFR, and/or avoid the UE occupying dedicated CF PRACH resources for BFR when the TA timer is expired, a TA timer is not running, or UL is not synchronized. The UE and/or the network may apply the following methods.

For example, the UE could not initiate a BFR request procedure and/or a RA procedure for BFR (if beam failure occurs). As another example, the UE may determine whether to initiate a BFR request procedure and/or a RA procedure for BFR based on whether a TA timer is expired, a TA timer is not running, or UL is not synchronized. In one embodiment, if a TA timer is expired, a TA timer is not running, or UL is not synchronized, the UE may not initiate a BFR request procedure and/or a RA procedure for BFR.

As another example, when the BFR counter reaches a maximum number, the UE may not initiate a BFR request procedure and/or a RA procedure for BFR when a TA timer is expired, a TA timer is not running, or UL is not synchronized. As another example, when the UE receives a "beam failure instance" notification from lower layer (e.g. PHY layer), the UE may not increment the BFR counter when a TA timer is expired, a TA timer is not running, or UL is not synchronized. Alternatively, when the UE receives a "beam failure instance" notification from lower layer (e.g. PHY layer), the UE may increment the BFR counter when a TA timer is expired, a TA timer is not running, or UL is not synchronized.

As another example, the UE may or may not maintain the BFR counter and/or the specific timer when a TA timer is expired, a TA timer is not running, or UL is not synchronized. In one embodiment, the UE may reset the BFR counter and/or the specific timer when a TA timer is expired, a TA timer is not running, or UL is not synchronized.

As another example, the UE may or may not ignore or discard the "beam failure instance" notification when a TA timer is expired, a TA timer is not running, or UL is not synchronized. In one embodiment, PHY layer may or may not transmit a "beam failure instance" notification to higher layer (e.g. MAC layer) when a TA timer is expired, a TA timer is not running, or UL is not synchronized. In one embodiment, PHY layer may or may not perform beam failure detection, e.g. PHY may or may not measure reference signal(s) for beam failure detection, SSB and/or CSI-RS. As another example, the UE may or may not measure candidate beam(s), wherein the candidate beam(s) may be configured by the network.

As another example, the UE may release the PRACH resources (for beam failure recovery) when the TA timer is expired, a TA timer is not running, or UL is not synchronized. PRACH resource for BFR is UE dedicated resource (e.g. resource dedicated to the UE), so if a UE releases the PRACH resource for BFR, network could allocate the PRACH resource for BFR to other UEs. The benefit is to increase the resource usage efficiency.

Figure 7:
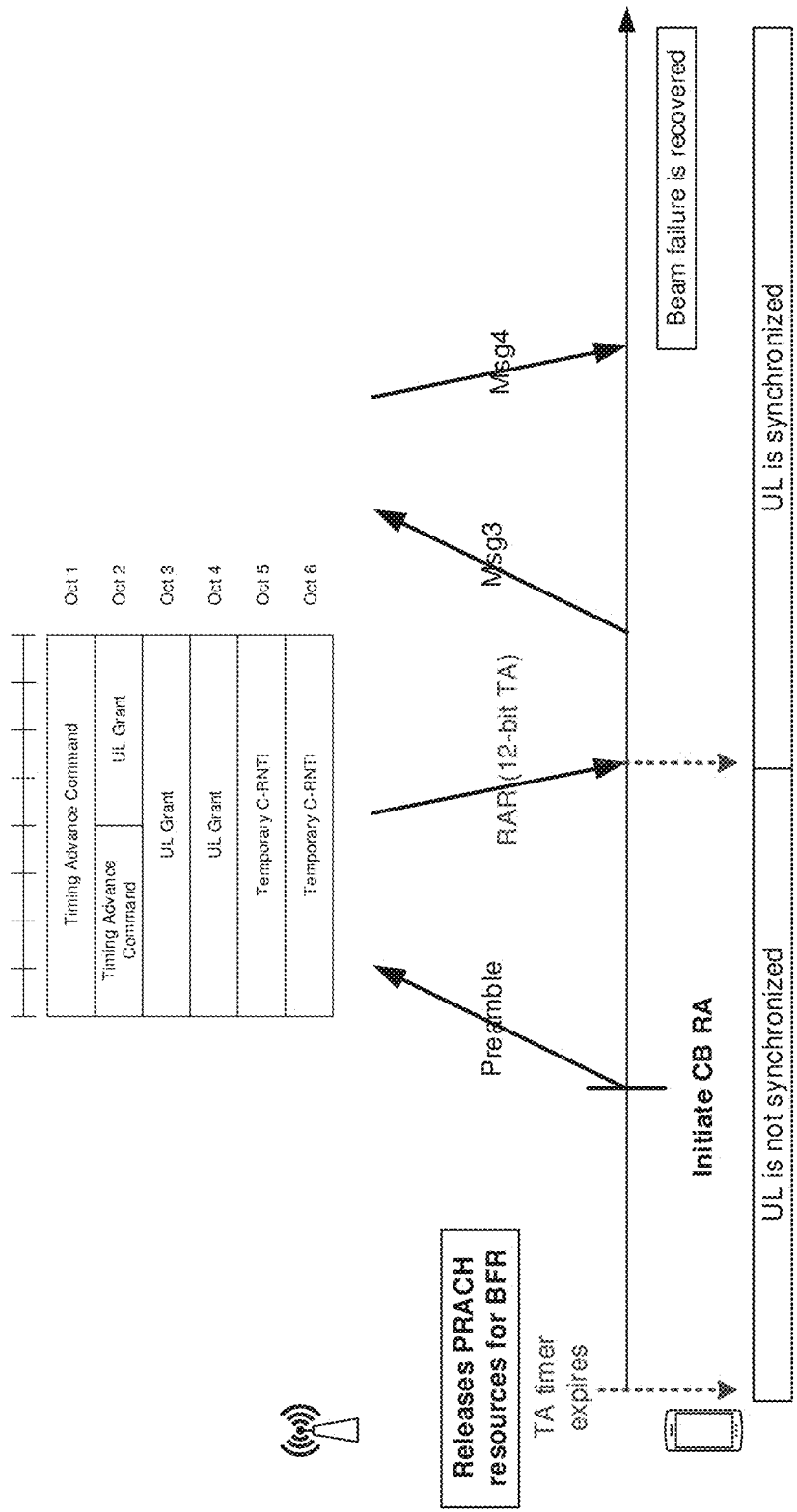
FIG. 7 is a diagram according to one exemplary embodiment.

An illustration is shown in FIG. 7, when TA timer expires, the UE may release PRACH resources for beam failure recovery. Then, if the UE detects beam failure, the UE may initiate a CB RA procedure. During the CB RA procedure, the UE may receive a RAR including an absolute TA command. Then the UE could apply the absolute TA command to recover the TA (i.e. UL may be synchronized); and beam failure may be recovered when receiving a Msg 4 (e.g. contention resolution completion).

More specifically, when a TA timer is expired, a TA timer is not running, or UL is not synchronized, the UE may determine whether to initiate a BFR request procedure and/or a RA procedure based on whether there is at least one reference signal among a reference signal set whose measured quality is above a threshold. In one embodiment, the reference signal set may comprise SSB and/or CSI-RS. The threshold may be rsrp-ThresholdSSB and/or csirs-dedicatedRACH-Threshold. The reference signal set may be for searching for or obtaining candidate beam or beam index during the BFR procedure.

For example, the UE may initiate the BFR request procedure and/or the (contention-based) RA procedure when the TA timer is expired if there is no any SSB or CSI-RS with measured quality above the threshold among the reference signal set. As another example, the UE may not initiate the BFR request procedure and/or the (contention-based) RA procedure when the TA timer is expired if there is SSB or CSI-RS with measured quality above the threshold.

More specifically, when a TA timer is expired, a TA timer is not running, or UL is not synchronized, since the BFR request procedure may not be initiated, the UE may monitor a PDCCH, e.g. PDCCH order, via configured TCI state(s) for PDCCH monitoring, which may be activated or not activated. Alternatively, the UE may monitor a PDCCH via the TCI state for monitoring PDCCH, which is the latest TCI state activated before the TA timer is expired, the TA timer is not running, or UL is not synchronized. Alternatively, a specific TCI state may be indicated by the network (e.g. indicated by a MAC CE, a PHY signaling, or a RRC signaling) before the TA timer is expired, the TA timer is not running, or UL is not synchronized. The UE may monitor the PDCCH via the specific TCI state.

On the other hand, when a TA timer is expired, a TA timer is not running, or UL is not synchronized, the UE may initiate a BFR request procedure and/or a RA procedure for BFR. After initiating the BFR request procedure and/or the RA procedure for BFR. The UE may receive a PDCCH from a network. The PDCCH may be for triggering a contention free PRACH transmission. In one embodiment, the PDCCH may be a PDCCH order. Alternatively, the PDCCH may be for triggering a procedure for the UE to obtain a (updated) TA command value. Alternatively, the PDCCH may comprise a (updated) TA command value. Alternatively, the PDCCH may correspond to a downlink transmission comprising a (updated) TA command value, e.g. MAC-CE in a PDSCH corresponding to the PDCCH.

For example, if a TA timer is expired, a TA timer is not running, or UL is not synchronized, the UE may expect the PDCCH is for triggering a procedure for obtaining a TA command value, e.g. PDCCH order. Alternatively, the UE may expect the PDCCH explicitly/implicitly comprises a TA command value. If a TA timer is expired, a TA timer is not running, or UL is not synchronized, network may transmit a PDCCH in response to the preamble, wherein the PDCCH is for triggering a procedure for obtaining a TA command value.

As another example, if a TA timer is expired, a TA timer is not running, or UL is not synchronized, the UE may not expect the PDCCH is not for triggering a procedure for obtaining a TA command value, e.g. PDCCH order. Alternatively, the UE may not expect the PDCCH does not explicitly/implicitly comprise a TA command value. If a TA timer is expired, a TA timer is not running, or UL is not synchronized, network may not transmit a PDCCH in response to the preamble, wherein the PDCCH is not for triggering a procedure for obtaining a TA command value.

As another example, if a TA timer is expired, a TA timer is not running, or UL is not synchronized, the UE may not expect the PDCCH is a downlink assignment or an UL grant. If a TA timer is expired, a TA timer is not running, or UL is not synchronized, network may not transmit a downlink assignment or an UL grant as the PDCCH in response to the preamble.

As another example, if a TA timer is expired, a TA timer is not running, or UL is not synchronized, the UE may expect the PDCCH comprises a TA command value. If a TA timer is expired, a TA timer is not running, or UL is not synchronized, network may transmit a PDCCH comprising a TA command value, wherein the PDCCH is in response to the preamble.

As another example, if a TA timer is expired, a TA timer is not running, or UL is not synchronized, the UE may expect the PDCCH corresponds to a downlink transmission comprising a (updated) TA command value, e.g. MAC-CE in a PDSCH corresponding to the PDCCH. If a TA timer is expired, a TA timer is not running, or UL is not synchronized, network may transmit a PDCCH corresponding to a downlink transmission comprising a (updated) TA command value, e.g. MAC-CE.

All above examples can be formed to a new or alternative embodiment. For example, the UE may not expect the PDCCH is a downlink assignment or an UL grant. The UE may expect the PDCCH is a PDCCH order.

More specifically, the UE may perform or initiate a random access procedure which is not triggered for BFR when TA timer is expired, a TA timer is not running, or UL is not synchronized. For example, the random access procedure may be triggered by a number of events, e.g. Initial access from RRC_IDLE, RRC Connection Re-establishment procedure, Handover, DL or UL data arrival during RRC_CONNECTED when UL synchronization status is "non-synchronized", Transition from RRC_INACTIVE, and/or Request for Other SI.

More specifically, if a TA timer is expired, a TA timer is not running, or UL is not synchronized when the UE performs a random access procedure, the UE may stop the random access procedure. Alternatively, the UE may consider the random access procedure is not successful.

More specifically, the UE may perform beam sweeping to monitor a PDCCH, e.g. the UE may monitor the PDCCH via each Rx beam of the UE or different spatial filter or parameter within the same or different time or frequency unit. The network may perform beam sweeping to transmit a PDCCH, e.g. the network may transmit the PDCCH via each Tx beam of the network or different spatial filter or parameter within the same or different time or frequency unit.

More specifically, the UE may or may not monitor the PDCCH on a CORESET for BFR. The PDCCH may be a PDCCH for responding a BFR request, wherein the BFR request may be a preamble (or Msg1) of a random access procedure which is initiated by BFR. The PDCCH may be monitored on a CORESET for BFR.

More specifically, the network may configure a RACH configuration for the UE. The RACH configuration may be configured via a system information, e.g. the RACH configuration may be RACH-ConfigCommon information element. The RACH configuration may be configured via RRC signaling, e.g. the RACH configuration may be RACH- ConfigDedicated information element. The RACH configuration may or may not indicate resources for BFR. For example, the RACH configuration may indicate PRACH resources and/or RA preamble(s), wherein the PRACH resources and/or RA preamble(s) may be associated with SSB resource and/or CSI-RS resource. In one embodiment, the network may or may not configure a set of RA preambles and corresponding PRACH resource(s) for BFR.

More specifically, if a TA timer is expired, a TA timer is not running, or UL is not synchronized, the UE may be allowed to perform the random access preamble transmission (and/or beam failure recovery request). In one embodiment, if a TA timer is expired, a TA timer is not running, or UL is not synchronized, the UE may not perform any UL transmission except for transmitting random access preamble (and/or beam failure recovery request). The TA timer may be associated with a TAG (e.g. PTAG or a STAG), wherein the TAG(s) may be associated the serving cell(s).

More specifically, the network may be a cell. The BFR request procedure and/or the RA procedure may be performed between the UE and the cell. The TA timer may be associated with a TAG, wherein the TAG may be associated with the cell.

More specifically, the random access procedure may be contention-based random access procedure or contention-free random access procedure. In one embodiment, for contention-based random access procedure, the UE may select a common RA preamble (e.g. RA preamble not for contention free random access), wherein the common RA preamble may be shared by different UEs. For contention-free random access procedure, the UE may select a RA preamble which is associated with the set of RA preambles for beam failure recovery request and corresponding PRACH resource(s). The set of RA preambles for beam failure recovery request may be configured by RRC. Preferably, the preamble on PRACH for BFR is a BFR request.

More specifically, the PDCCH may be addressed to the C-RNTI or RA-RNTI or the CS-RNTI. The PDCCH may be a PDCCH order. The PDCCH may include a downlink assignment. The transport block could be received on PDSCH based on the configured DL assignment. The PDCCH may include an UL grant. The PDCCH may or may not be transmitted via a candidate beam. The PDCCH may include a DCI. The PDCCH may indicate a PDSCH. The PDCCH may indicate a PUSCH.

More specifically, the beam failure means that the radio link qualify of the serving beam (e.g., SSB and/or CSI-RS) may be worse than a threshold. The beam failure may mean that the quality of a link between the UE and base station may be worse than a threshold, wherein the link may be all serving beam (e.g. SSB and/or CSI-RS) between the UE and base station.

More specifically, a SSB resource may be associated with a DL beam(s) of network. T CSI-RS resource may be associated with a DL beam(s) of network. The higher layer or upper layer may be MAC layer or RRC layer. The lower layer may be PHY layer. The beam failure request procedure may be equal to the beam failure procedure.

Figure 8:
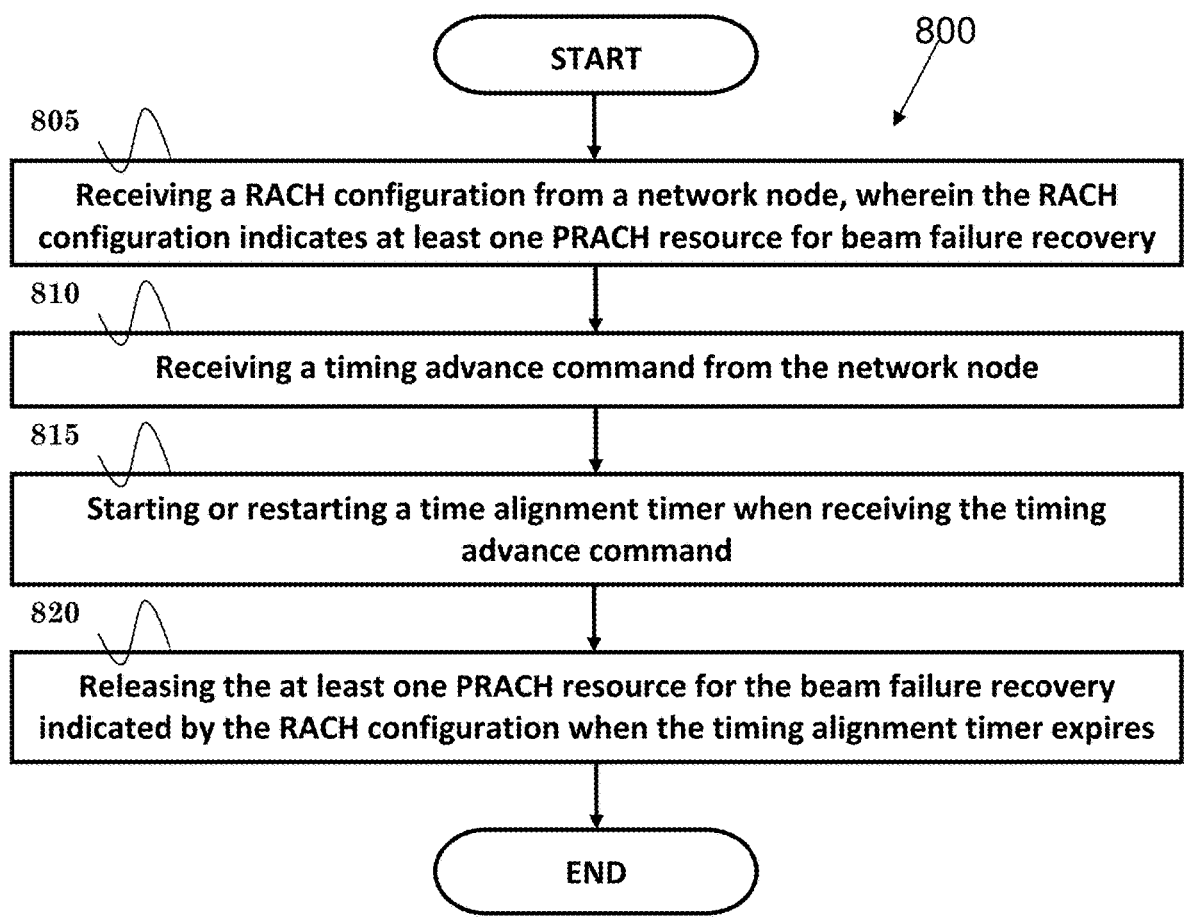
FIG. 8 is a flow chart according to one exemplary embodiment.

FIG. 8 is a flow chart 800 according to one exemplary embodiment from the perspective of a UE. In step 805, the UE receives a Random Access Channel (RACH) configuration from a network node, wherein the RACH configuration indicates at least one Physical Random Access Channel (PRACH) resource for beam failure recovery. In step 810, the UE receives a timing advance command from the network node. In step 815, the UE starts or restarts a time alignment timer when receiving the timing advance command. In step 820, the UE releases the at least one PRACH resource for beam failure recovery indicated by the RACH configuration when the timing alignment timer expires.

In one embodiment, the RACH configuration could be configured for the beam failure recovery. The PRACH resource(s) for beam failure recovery could be a resource dedicated to the UE. Furthermore, the at least one PRACH resource for beam failure recovery could be associated with at least one Synchronization Signal Block (SSB) resource and/or at least one Channel State Information-based Reference Signal (CSI-RS) resource.

In one embodiment, the RACH configuration indicates at least one random access preamble for the beam failure recovery. The at least one random access preamble could be associated with at least one SSB resource and/or at least one CSI-RS resource.

In one embodiment, the UE could initiate (or perform) a contention free random access procedure for beam failure recovery by using the PRACH resource(s) for beam failure recovery when detecting a beam failure and the timing alignment timer is running. The UE may not be able to perform a contention free random access procedure for the beam failure recovery by using the at least one PRACH resource for beam failure recovery when the timing alignment timer is not running. The timing alignment timer expires could mean UL is not synchronized.

In one embodiment, the UE could initiate a contention based random access procedure when detecting a beam failure and the timing alignment timer is not running.

In one embodiment, the UE could initiate a contention free random access procedure for the beam failure recovery by using the at least one PRACH resource for beam failure recovery when detecting a beam failure and the timing alignment timer is running. The beam failure could be detected when a beam failure recovery counter reaches (or is equal to) a maximum number, wherein the beam failure recovery counter is incremented based on a beam failure indication.

Referring back to FIGS. 3 and 4, in one exemplary embodiment of a UE for performing a random access procedure, the device 300 includes a program code 312 stored in the memory 310. The CPU 308 could execute program code 312 to enable the UE (i) to receive a RACH configuration from a network node, wherein the RACH configuration indicates at least one PRACH resource for beam failure recovery, (ii) to receive a timing advance command from the network node, (iii) to start or restart a time alignment timer when receiving the timing advance command, and (iv) to release the at least one PRACH resource for beam failure recovery indicated by the RACH configuration when the timing alignment timer expires. Furthermore, the CPU 308 can execute the program code 312 to perform all of the above-described actions and steps or others described herein.

FIG. 9 is a flow chart 900 according to one exemplary embodiment from the perspective of a UE. In step 905, the UE detects that a beam failure occurs. In step 910, the UE determines whether to initiate a beam failure request procedure based on whether uplink is synchronized or not.

Referring back to FIGS. 3 and 4, in one exemplary embodiment of a UE, the device 300 includes a program code 312 stored in the memory 310. The CPU 308 could execute program code 312 to enable the UE (i) to detect that a beam failure occurs, and (ii) to determine whether to initiate a beam failure request procedure based on whether uplink is synchronized or not. Furthermore, the CPU 308 can execute the program code 312 to perform all of the above-described actions and steps or others described herein.

FIG. 10 is a flow chart 1000 according to one exemplary embodiment from the perspective of a UE. In step 1005, the UE detects that a beam failure occurs. In step 1010, the UE determines whether to initiate a random access procedure based on whether uplink is synchronized or not.

Referring back to FIGS. 3 and 4, in one exemplary embodiment of a UE, the device 300 includes a program code 312 stored in the memory 310. The CPU 308 could execute program code 312 to enable the UE (i) to detect that a beam failure occurs, and (ii) to determine whether to initiate a random access procedure based on whether uplink is synchronized or not. Furthermore, the CPU 308 can execute the program code 312 to perform all of the above-described actions and steps or others described herein.

In the context of the embodiments illustrated in FIGS. 9 and 10 and discussed above, in one embodiment, the UE could initiate the beam failure request procedure if uplink is synchronized. However, the UE may not initiate the beam failure request procedure if uplink is not synchronized. The UE could also initiate the random access procedure if uplink is synchronized. However, the UE may not initiate the random access procedure if uplink is not synchronized.

In one embodiment, the UE could initiate the beam failure request procedure if uplink is not synchronized and there is no reference signal among a reference signal set whose measured quality is above a threshold. However, the UE may not initiate the beam failure request procedure if uplink is not synchronized and there is at least one reference signal among a reference signal set whose measured quality is above a threshold.

In one embodiment, the UE could initiate the random access procedure if uplink is not synchronized and there is no reference signal among a reference signal set whose measured quality is above (or better than) a threshold. However, the UE may not initiate the random access procedure if uplink is not synchronized and there is at least one reference signal among a reference signal set whose measured quality is above (or better than) a threshold. The threshold could be rsrp-ThresholdSSB and/or csirs-dedicatedRACH-Threshold.

In one embodiment, the UE could initiate the random access procedure if uplink is not synchronized, wherein the random access procedure is not triggered for beam failure recovery. Alternatively, the UE could initiate the random access procedure if uplink is synchronized, wherein the random access procedure is not triggered for beam failure recovery.

Figure 11:
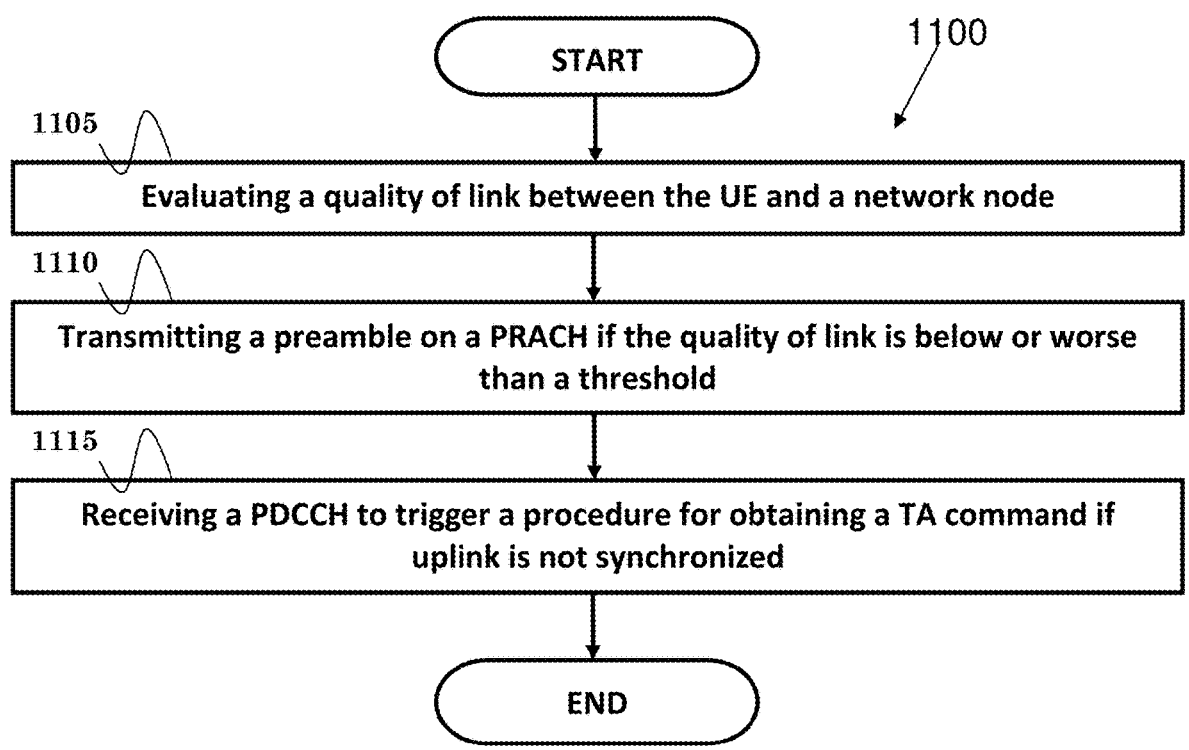
FIG. 11 is a flow chart according to one exemplary embodiment.

FIG. 11 is a flow chart 1100 according to one exemplary embodiment from the perspective of a UE. In step 1105, the UE evaluates a quality of link between the UE and a network node. In step 1110, the UE transmits a preamble on a PRACH if the quality of link is below or worse than a threshold. In step 1115, the UE receives a Physical Downlink Control Channel (PDCCH) to trigger a procedure for obtaining a Timing Advance (TA) command if uplink is not synchronized.

Referring back to FIGS. 3 and 4, in one exemplary embodiment of a UE, the device 300 includes a program code 312 stored in the memory 310. The CPU 308 could execute program code 312 to enable the UE (i) to evaluate a quality of link between the UE and a network node, (ii) to transmit a preamble on a PRACH if the quality of link is below or worse than a threshold, and (iii) to receive a PDCCH to trigger a procedure for obtaining a TA command if uplink is not synchronized. Furthermore, the CPU 308 can execute the program code 312 to perform all of the above-described actions and steps or others described herein.

Figure 12:
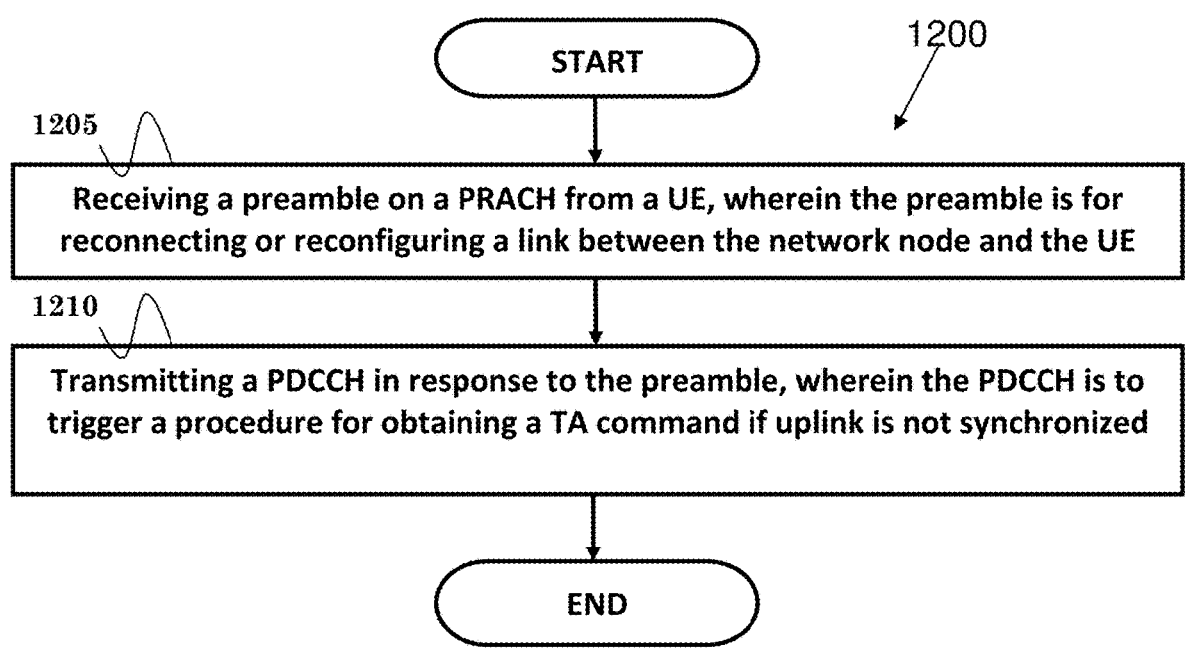
FIG. 12 is a flow chart according to one exemplary embodiment.

FIG. 12 is a flow chart 1200 according to one exemplary embodiment from the perspective of a network node. In step 1205, the network node receives a preamble on a PRACH from a UE, wherein the preamble is for reconnecting or reconfiguring a link between the network node and the UE. In step 1210, the network node transmits a PDCCH in response to the preamble, wherein the PDCCH is to trigger a procedure for obtaining a TA command if uplink is not synchronized.

Referring back to FIGS. 3 and 4, in one exemplary embodiment of a network node, the device 300 includes a program code 312 stored in the memory 310. The CPU 308 could execute program code 312 to enable the network node (i) to receive a preamble on a PRACH from a UE, wherein the preamble is for reconnecting or reconfiguring a link between the network node and the UE, and (ii) to transmit a PDCCH in response to the preamble, wherein the PDCCH is to trigger a procedure for obtaining a TA command if uplink is not synchronized. Furthermore, the CPU 308 can execute the program code 312 to perform all of the above-described actions and steps or others described herein.

Figure 13:
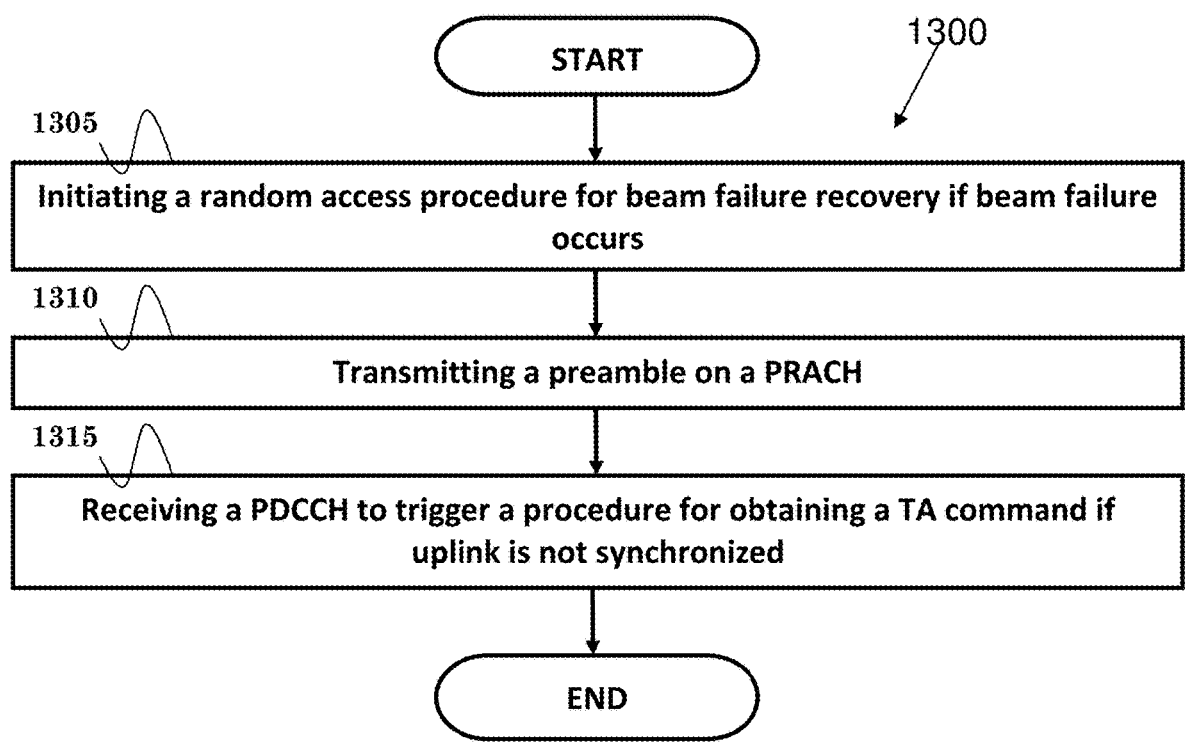
FIG. 13 is a flow chart according to one exemplary embodiment.

FIG. 13 is a flow chart 1300 according to one exemplary embodiment from the perspective of a UE. In step 1305, the UE initiates a random access procedure for beam failure recovery if beam failure occurs. In step 1310, the UE transmits a preamble on a PRACH. In step 1315, the UE receives a PDCCH to trigger a procedure for obtaining a Timing Advance (TA) command if uplink is not synchronized.

Referring back to FIGS. 3 and 4, in one exemplary embodiment of a UE, the device 300 includes a program code 312 stored in the memory 310. The CPU 308 could execute program code 312 to enable the UE (i) to initiate a random access procedure for beam failure recovery if beam failure occurs, (ii) to transmit a preamble on a PRACH, and (iii) to receive a PDCCH to trigger a procedure for obtaining a TA command if uplink is not synchronized. Furthermore, the CPU 308 can execute the program code 312 to perform all of the above-described actions and steps or others described herein.

In the context of the embodiments illustrated in FIGS. 11, 12, and 13 and discussed above, in one embodiment, the procedure could be a random access procedure. The TA command could comprise a value for the UE to set an initial time alignment or to adjust time alignment. The length of the value could be 6 bits or 12 bits. The TA command could be included in a random access response, or in a MAC control element, e.g. a timing advance command MAC control element.

In one embodiment, the beam failure could occur when a beam failure recovery counter reaches a maximum number. The beam failure recovery counter could be used to count the number of beam failure instance. The beam failure recovery counter could be incremented when MAC layer receives a beam failure instance notification from PHY layer.

In the context of the embodiments illustrated in FIGS. 8-13 and discussed above, in one embodiment, uplink could be synchronized when a time alignment timer is running. However, uplink may not be synchronized when a time alignment timer is not running, or when a time alignment timer is expired. In one embodiment, when the beam failure request procedure is initiated, the UE could initiate a random access procedure for beam failure recovery.

In one embodiment, the UE could release a PRACH resource, wherein the PRACH resource is configured for beam failure recovery. Alternatively, the UE may not release a PRACH resource, wherein the PRACH resource is configured for beam failure recovery.

In one embodiment, the UE could monitor a PDCCH on a specific reference signal, wherein the specific reference signal is configured for PDCCH monitoring. More specifically, the UE could monitor a PDCCH on a specific reference signal, wherein the specific reference signal is associated with a latest TCI state activated before uplink is not synchronized. The TCI state could be indicated by the network (e.g. indicated by a MAC CE, a PHY signaling, or a RRC signaling).

In one embodiment, the random access procedure could be triggered for beam failure recovery. The random access procedure could also be triggered for initial access from RRC_IDLE, RRC Connection Re-establishment procedure, Handover, DL or UL data arrival during RRC_CONNECTED when UL synchronization status is "non-synchronized", Transition from RRC_INACTIVE, or Request for Other SI. The random access procedure could be a contention free random access procedure, or a contention-based random access procedure.

In one embodiment, the PDCCH could be a PDCCH order. However, the PDCCH may not be a downlink assignment or an UL grant. The network node could be a cell, a TRP (Transmission/Reception Point), or a base station. The reference signal could be a SSB, a CSI-RS, or a (DL) beam.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE), comprising:
    receiving a Random Access Channel (RACH) configuration from a network node, wherein the RACH configuration indicates at least one Physical Random Access Channel (PRACH) resource for a beam failure recovery;
    receiving a timing advance command from the network node;
    starting or restarting a time alignment timer when receiving the timing advance command;
    initiating a contention free random access procedure for the beam failure recovery by using the at least one PRACH resource for the beam failure recovery when detecting a beam failure and the timing alignment timer is running; and
    releasing the at least one PRACH resource for the beam failure recovery indicated by the RACH configuration when the timing alignment timer expires.

2. The method of claim 1, wherein the RACH configuration is for the beam failure recovery.

3. The method of claim 1, wherein the PRACH resource for the beam failure recovery is a resource dedicated to the UE.

4. The method of claim 1, wherein the at least one PRACH resource for the beam failure recovery is associated with at least one Synchronization Signal Block (SSB) resource and/or at least one Channel State Information-based Reference Signal (CSI-RS) resource.

5. The method of claim 1, wherein the RACH configuration indicates at least one random access preamble for the beam failure recovery.

6. The method of claim 5, wherein the at least one random access preamble is associated with at least one SSB resource and/or at least one CSI-RS resource.

7. The method of claim 1, wherein the UE does not perform a contention free random access procedure for the beam failure recovery by using the at least one PRACH resource for the beam failure recovery when the timing alignment timer is not running.

8. The method of claim 1, further comprising:
    initiating a contention based random access procedure when detecting a beam failure and the timing alignment timer is not running.

9. The method of claim 1, wherein the beam failure is detected when a beam failure recovery counter reaches a maximum number, wherein the beam failure recovery counter is incremented based on a beam failure indication.

10. A User Equipment (UE), comprising:
    a control circuit;
    a processor installed in the control circuit; and
    a memory installed in the control circuit and operatively coupled to the processor;
    wherein the processor is configured to execute a program code stored in the memory to:
        receive a Random Access Channel (RACH) configuration from a network node, wherein the RACH configuration indicates at least one Physical Random Access Channel (PRACH) resource for a beam failure recovery;
        receive a timing advance command from the network node;
        start or restarting a time alignment timer when receiving the timing advance command;
        initiate a contention free random access procedure for the beam failure recovery by using the at least one PRACH resource for the beam failure recovery when detecting a beam failure and the timing alignment timer is running; and
        release the at least one PRACH resource for the beam failure recovery indicated by the RACH configuration when the timing alignment timer expires.

11. The UE of claim 10, wherein the RACH configuration is for the beam failure recovery.

12. The UE of claim 10, wherein the PRACH resource for the beam failure recovery is a resource dedicated to the UE.

13. The UE of claim 10, wherein the at least one PRACH resource for the beam failure recovery is associated with at least one Synchronization Signal Block (SSB) resource and/or at least one Channel State Information-based Reference Signal (CSI-RS) resource.

14. The UE of claim 10, wherein the RACH configuration indicates at least one random access preamble for the beam failure recovery.

15. The UE of claim 14, wherein the at least one random access preamble is associated with at least one SSB resource and/or at least one CSI-RS resource.

16. The UE of claim 10, wherein the UE does not perform a contention free random access procedure for the beam failure recovery by using the at least one PRACH resource for the beam failure recovery when the timing alignment timer is not running.

17. The UE of claim 10, wherein the processor is further configured to execute a program code stored in the memory to:
    initiate a contention based random access procedure when detecting a beam failure and the timing alignment timer is not running.

18. The method of claim 10, wherein the beam failure is detected when a beam failure recovery counter reaches a maximum number, wherein the beam failure recovery counter is incremented based on a beam failure indication.

* * * * *